US012045307B2

(12) United States Patent
Khailany et al.

(10) Patent No.: US 12,045,307 B2
(45) Date of Patent: Jul. 23, 2024

(54) FINE-GRAINED PER-VECTOR SCALING FOR NEURAL NETWORK QUANTIZATION

(71) Applicant: NVIDIA Corporation, Santa Clara, CA (US)

(72) Inventors: Brucek Kurdo Khailany, Austin, TX (US); Steve Haihang Dai, Union City, CA (US); Rangharajan Venkatesan, San Jose, CA (US); Haoxing Ren, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 894 days.

(21) Appl. No.: 17/086,118

(22) Filed: Oct. 30, 2020

(65) Prior Publication Data

US 2022/0067530 A1      Mar. 3, 2022

Related U.S. Application Data

(60) Provisional application No. 63/089,889, filed on Oct. 9, 2020, provisional application No. 63/071,949, filed on Aug. 28, 2020.

(51) Int. Cl.
*G06F 17/16* (2006.01)
*G06F 5/01* (2006.01)
*G06F 7/544* (2006.01)

(52) U.S. Cl.
CPC .............. *G06F 17/16* (2013.01); *G06F 5/01* (2013.01); *G06F 7/5443* (2013.01)

(58) Field of Classification Search
CPC ...... G06N 3/063; G06N 3/0464; G06N 3/048; G06N 3/0495; G06N 3/08; G06N 3/084;
(Continued)

(56) References Cited

U.S. PATENT DOCUMENTS 11,520,561 B1    12/2022 Afzal
2018/0314940 A1* 11/2018 Kundu .................. G06N 3/044
(Continued)

OTHER PUBLICATIONS

Steve Dai and Rangharajan Venkatesan and Haoxing Ren and Brian Zimmer and William J. Dally and Brucek Khailany, "VS-Quant: Per-vector Scaled Quantization for Accurate Low-Precision Neural Network Inference", arXiv:2102.04503, 2021 (Year: 2021).*
(Continued)

*Primary Examiner* — Matthew D Sandifer
(74) *Attorney, Agent, or Firm* — Leydig, Voit & Mayer, Ltd.

(57) ABSTRACT

Today neural networks are used to enable autonomous vehicles and improve the quality of speech recognition, real-time language translation, and online search optimizations. However, operation of the neural networks for these applications consumes energy. Quantization of parameters used by the neural networks reduces the amount of memory needed to store the parameters while also reducing the power consumed during operation of the neural network. Matrix operations performed by the neural networks require many multiplication calculations, so reducing the number of bits that are multiplied reduces the energy that is consumed. Quantizing smaller sets of the parameters using a shared scale factor improves accuracy compared with quantizing larger sets of the parameters. Accuracy of the calculations may be maintained by quantizing and scaling the parameters using fine-grained per-vector scale factors. A vector includes one or more elements within a single dimension of a multi-dimensional matrix.

22 Claims, 15 Drawing Sheets

(58) Field of Classification Search
CPC .. G06F 2207/4824; G06F 7/5443; G06F 5/01; G06F 5/012; G06F 17/16

See application file for complete search history.

(56) References Cited

U.S. PATENT DOCUMENTS

| | | | | |
|---|---|---|---|---|
| 2018/0322607 | A1* | 11/2018 | Mellempudi | ......... G06F 7/5443 |
| 2019/0171927 | A1 | 6/2019 | Diril et al. | |
| 2020/0193273 | A1* | 6/2020 | Chung | .................... G06F 17/16 |
| 2021/0110508 | A1* | 4/2021 | Mellempudi | .......... G06N 3/084 |
| 2021/0350210 | A1 | 11/2021 | Gong et al. | |

OTHER PUBLICATIONS

Mellempudi, Naveen, et al. "Ternary neural networks with fine-grained quantization." arXiv preprint arXiv:1705.01462 (2017) (Year: 2017).*

Wikipedia.org, "Artificial neural network", retrieved from https://en.wikipedia.org/wiki/Artificial_neural_network (Year: 2024).*

Bhandare, A., et al., "Efficient 8-bit quantization of transformer neural machine language translation model," arXiv preprint arXiv:1906:00532, 2019.

Choi, J., et al., "PACT: Parameterized clipping activation for quantized neural networks," arXiv preprint arXiv:1805.06085, 2018.

Courbariaux, M., et al, "Binary Connect: Training deep neural networks with binary weights during propagations," In Advances in neural information processing systems, pp. 3123-3131, 2015.

Fang, J., et al., "Near-lossless post-training quantization of deep neural networks via a piecewise linear approximation," arXiv preprint arXiv:2002.00104, 2020.

Gong, Y., et al., "Compressing deep convolutional networks using vector quantization," arXiv preprint arXiv:1412.6115, 2014.

Gray, R., "Vector quantization," IEEE Assp Magazine, 1(2) 4-29, 1984.

Hubara, I., et al., "Binarized neural networks," In Advances in neural information processing systems, pp. 4107-4115, 2016.

Jain, S., et al., "Quantizing long-tailed datastructures with two scale factors for deep neural networks," In Proc. DAC, pp. 1-6, 2019.

Khoram, S., et al., "Adaptive quantization of neural networks," In International Conference on Learning Representations, 2018.

Koster, U., et al., "An adaptive numerical format for efficient training of deep neural networks," In Advances in neural information processing systems, pp. 1742-1752, 2017.

Krishnamoorthi, R., "Quantizing deep convolutional networks for efficient inference: A Whitepaper," arXiv preprint arXiv:1806.08342, 2018.

Lecun, Y., et al., "Deep Learning," nature, 521(7553):436-444, 2015.

Lee, J., et al., "Quantization for rapid deployment of deep neural networks," arXiv preprint arXiv:1810.05488, 2018.

McKinstry, J., et al., "Discovering low-precision networks close to full-precision networks for efficient embedded inference," arXiv preprint arXiv:1809.04191, 2018.

Mishra, A., et al., "Apprentice: Using knowledge distillation techniques to improve low-precision network accuracy," arXiv preprint arXiv:1711.05852, 2017.

Miyashita, D., et al., "Convolutional neural networks using logarithmic data representation," arXiv preprint arXiv:1603.01025, 2016.

Moons, B., et al., "Minimum energy quantized neural networks," In 2017 51$^{st}$ Asilomar Conference on Signals, Systems and Computers, pp. 1921-1925, IEEE, 2017.

Nagel, M., et al., "Data-free quantization through weight equalization and bias correction," In Proceedings of the IEEE International Conference on Computer Vision, pp. 1325-1334, 2019.

Prato, G., et al., "Fully quantized transformer for improved translation," arXiv preprint arXiv:1910.10485, 2019.

Shen, S., et al., "Q-bert: Hessian based ultra low precision quantization of bert," In AAAI, pp. 8815-8821, 2020.

Sijstermans, F., "The NVIDIA deep learning accelerator."

Stock, P., et al., "And the bit goes down: Revisiting the quantization of neural networks," In Eighth International Conference on Learning Representations, 2020.

Sze, V., et al., "Efficient processing of deep neural networks," Synthesis Lectures on Computer Architecture, 15(2):1-341, 2020.

Tambe, T., et al., "Algorithm-hardware co-design of adaptive floating-point encodings for resilient deep learning inference," Design Automation Conference (DAC), 2020.

Venkatesan, R., et al., "MAGNet: A modular accelerator generator for neural networks," In ICCAD, pp. 1-8, 2019.

Wu, B., et al., "Mixed precision quantization of convnets via differentiable neural architecture search," arXiv preprint arXiv:1812.00090, 2018.

Wu, H., "Low precision inference on gpus," GPU Technology Conference (GTC), 2019.

Wu, H., et al., "Integer quantization for deep learning inference: Principles and empirical evaluation," arXiv preprint arXiv:2004.09602, 2020.

Wu, J., et al., "Quantized convolutional neural networks for mobile devices," In Proceedings of the IEEE Conference on Computer Vision and Pattern Recognition, pp. 4820-4828, 2016.

Wu, Y., et al., "Google's neural machine translation system: Bridging the gap between human machine translation." arXiv preprint arXiv:1609.08144, 2016.

Zafrir, O., et al., "Q8bert: Quantized 8bit bert," arXiv preprint arXiv:1910.06188, 2019.

Zhao, R., et al., "Improving neural network quantization without retraining using outlier channel splitting," In International Conference on Machine Learning, pp. 7543-7552, 2019.

Zhu, C., et al., "Trained ternary quantization," arXiv preprint arXiv:1612.01064, 2016.

Bubek, S., et al., "Sparks of artificial general intelligence: Early experiments with GPT-4," arXiv preprint arXiv:2303.12712, 2023.

Lin, J., et al., "AWQ: Activation-aware weight quantization for LLM compression and acceleration," 2023.

Frantar, E., et al., "GPTQ: Accurate quantization for generative pre-trained transformers," in The Eleventh International Conference on Learning Representations, 2023.

Kim, S., et al., "SqueezeLLM: Dense-and-sparse quantization," 2023.

Park, E., et al., "Energy-efficient neural network accelerator based on outlier-aware low-precision computation," in 2018 ACM/IEEE 45th Annual International Symposium on Computer Architecture (ISCA), pp. 688-698, 2018.

Xiao, G., et al., "SmoothQuant: Accurate and efficient post-training quantization for large language models, " 2023.

Choi, J., et al., "PACT: Parameterized clipping activation for quantized neural networks," 2018.

Sakr, C., et al., "Optimal clipping and magnitude-aware differentiation for improved quantization-aware training," 2022.

Dettmers, T., et al., "The case for 4-bit precision: k-bit inference scaling laws," 2023.

Dai, S., et al., "VS-Quant: Per-vector scaled quantization for accurate low-precision neural network inference," In Proceedings of Machine Learning and Systems, vol. 3, pp. 873-884, 2021.

Rouhani, B., et al., "With shared microexponents, a little shifting goes a long way," 2023.

Rouhani, B., et al., "Pushing the limits of narrow precision inferencing at cloud scale with microsoft floating point," in Advances in Neural Information Processing Systems, vol. 33, p. 10271-10281, Curran Associates, 2020.

Wu, X., et al., "ZeroQuant-FP: A leap forward in llms post-training W4A8 quantization using floating-point formats," 2023.

Lo, Y.C., et al., "Block and subword-scaling floating-point (BSFP): An efficient non-uniform quantization for low precision inference," In the Eleventh International Conference on Learning Representations, 2023.

Lloyd, S., et al., "Least squares quantization in Pcm," IEEE Transactions on Information Theory, vol. 28, No. 2, pp. 129-137, 1982.

Han, S., et al., "Deep compression: Compressing deep neural network with pruning, trained quantization and huffman coding," in

(56) References Cited

OTHER PUBLICATIONS

4th International Conference on Learning Representations, ICLR 2016, San Juan, Puerto Rico, May 2-4, 2016, Conference Track Proceedings, 2016.
Bondarenko, Y., et al., "Understanding and overcoming the challenges of efficient transformer quantization," 2021.
Tambe, T., et al., "Algorithm-hardware co-design of adaptive floating-point encodings for resilient deep learning inference," in 2020 57th ACM/IEEE Design Automation Conference (DAC), pp. 1-6, 2020.
Bai, H., et al., "Towards effiecient post-training quantization of pre-trained language models," 2021.
Yao, Z., et al., "ZeroQuant: Efficient and affordable post-training quantization for large-scale transformers," in Advances in Neural Information Processing Systems, 2022.
Dettmers, T., et al., "LLM.int8(): 8-bit matrix multiplication for transformers at scale," 2022.
Wei, X., et al., "Outlier suppression: Pushing the limit of low-bit transformer language models," 2023.
Guo, C., et al., "OliVe: Accelerating large language models via hardware-friendly outlier-victim pair quantization," ISCA '23 (New York, NY), Association for Computing Machinery, 2023.
Chee, J., et al., "QuIP: 2-bit quantization of large language models with guarantees," 2023.
Kim, Y.J., et al., "FineQuant: Unlocking efficiency with fine-grained weight-only quantization for LLMs," 2023.
Yao, Z., et al., "ZeroQuant-V2: Exploring post-training quantization in LLMs from comprehensive study to low rank compensation," 2023.
Zhang, Y., et al., "Integer or floating point? New outlooks for low-bit quantization on large language models," 2023.
Koster, U., et al., "Flexpoint: An adaptive numerical format for efficient training of deep neural networks." 2017.

\* cited by examiner

FINE-GRAINED PER-VECTOR SCALING FOR NEURAL NETWORK QUANTIZATION

CLAIM OF PRIORITY

This application claims the benefit of U.S. Provisional Application No. 63/071,949 titled "Fine-Grained Per-Vector Scaling for Neural Network Quantization," filed Aug. 28, 2020 and U.S. Provisional Application No. 63/089,889 titled "Fine-Grained Per-Vector Scaling for Neural Network Quantization," filed Oct. 9, 2020, the entire contents of both are incorporated herein by reference.

BACKGROUND

Quantization enables efficient acceleration of deep neural networks by reducing model memory footprint and exploiting low-cost integer math hardware units. Quantization maps floating-point weights and activations in a trained model to low-bitwidth integer values using scale factors, but suffers from accuracy degradation with low-bitwidth integers. When scale factors are shared at a coarse granularity across many dimensions of each tensor, effective precision of individual elements within the tensor are limited. There is a need for addressing these issues and/or other issues associated with the prior art.

SUMMARY

Today neural networks are used to enable autonomous vehicles and improve the quality of speech recognition, real-time language translation, and online search optimizations. However, operation of the neural networks for these applications consumes energy. Quantization of parameters used by the neural networks reduces the amount of memory needed to store the parameters while also reducing the power consumed during operation of the neural network. Matrix operations performed by the neural networks require many multiplication calculations, so reducing the number of bits that are multiplied reduces the energy that is consumed. Quantizing smaller sets of the parameters using a shared scale factor improves accuracy compared with quantizing larger sets of the parameters. Accuracy of the calculations may be maintained by quantizing and scaling the parameters using fine-grained per-vector scale factors. A vector includes one or more elements within a single dimension of a multi-dimensional matrix.

Embodiments of the present disclosure relate to fine-grained per-vector scaling for neural network parameter quantization. Systems and methods are disclosed that reduce the memory footprint of the neural network model by quantizing parameters (e.g., weights and/or activations) for the model using per-vector scale factors. A vector comprises one or more elements within a single dimension of a multi-dimensional tensor (or kernel). Quantization reduces the number of bits (e.g., resolution) used to represent a value. In an embodiment, a two-level scaling scheme combines a set of per-vector scale factors with a coarse-grained (per-layer, tensor, or channel) scale factor.

In contrast to conventional systems, such as those described above, the per-vector scaled quantization technique mitigates accuracy loss typical in existing quantized deep neural network (DNN) models. To reduce quantization-related accuracy loss, a separate scale factor may be used for each small vector of elements (e.g., 16-64) within a single dimension of a tensor. To achieve an efficient hardware implementation, the per-vector scale factors can be implemented with low-bitwidth integer or floating-point format values when calibrated using a two-level quantization scheme. Per-vector scaling may achieve better inference accuracy at low precision compared to conventional scaling techniques for neural networks. Additionally, in an embodiment, retraining is not required to use the per-vector quantization technique.

Systems and methods include receiving a scale factor for each vector of quantized parameters within a single dimension of a first multi-dimensional input tensor to provide a plurality of scale factors. A vector dot-product value is computed for each vector of quantized parameters. For each vector of quantized parameters, each vector dot-product value is modified according to a corresponding scale factor to produce a scaled vector dot-product value. The scaled vector dot-product values are accumulated to produce each element of a multi-dimensional output tensor.

BRIEF DESCRIPTION OF THE DRAWINGS

The present systems and methods for fine-grained per-vector scaling for neural network parameter quantization are described in detail below with reference to the attached drawing figures, wherein.

DETAILED DESCRIPTION

Figure 1A:
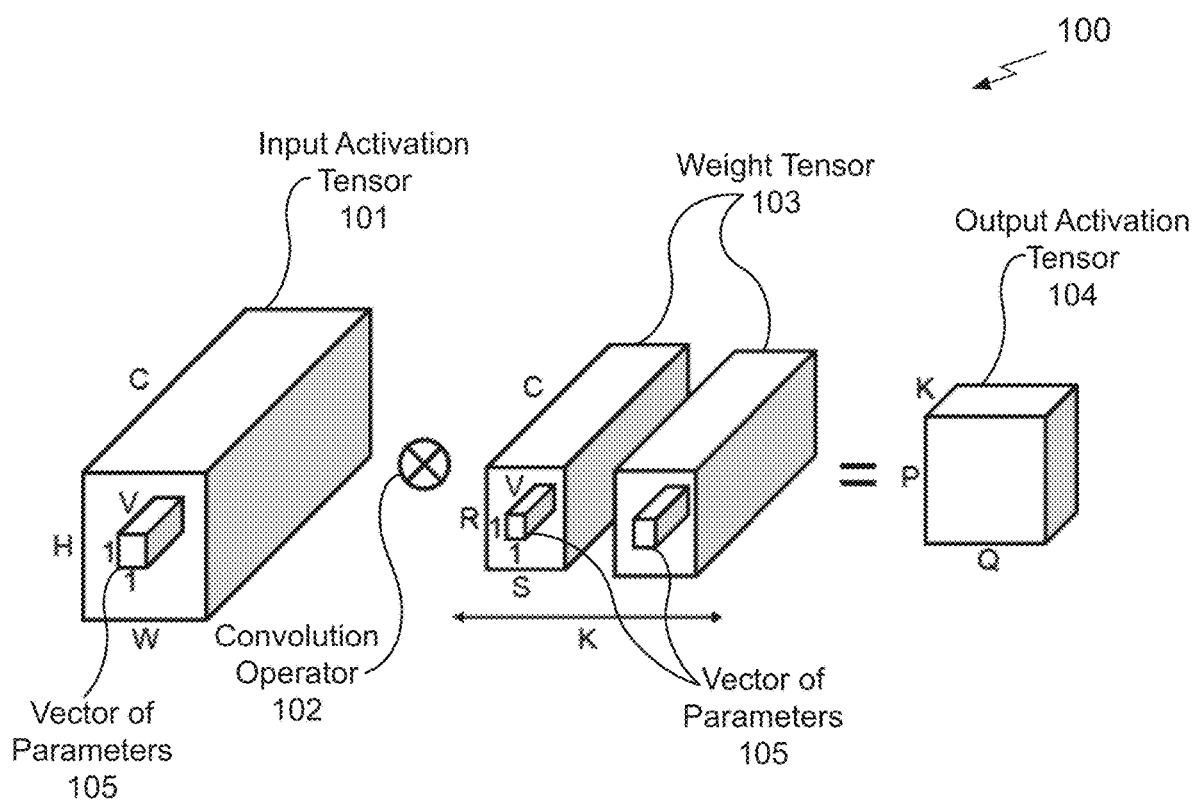
FIG. 1A is a conceptual diagram illustrating per-vector scaling for convolution computations, suitable for use in implementing some embodiments of the present disclosure.

Systems and methods are disclosed related to fine-grained per-vector scaling for neural network parameter quantization. The parameters include weights and/or activations. Per-vector scale factors for the weight parameters may be precomputed (via post-training calibration or quantization-aware retraining). The per-vector scale factors for the activation parameters may be dynamically computed during inferencing. Alternatively, the per-vector scale factors may be precomputed via post-training calibration or by quantization-aware retraining.

The weights and/or activation values are quantized for input to a layer of a neural network. For example, a (quantized) parameter vector may include 16 elements where each element is an 8-bit integer. In other embodiments, the elements are quantized to 2, 3, 4, 5, 6 or more bits for representing two's complement signed or unsigned integers. Weight-activation products are computed and summed to produce vector dot-products. The vector dot-products are then accumulated to compute elements of a multi-dimensional output tensor. In an embodiment, to mitigate accuracy loss of the output tensor caused by quantization of the weights and input activations, each vector dot-product is multiplied by the per-vector scaling factors before being accumulated. In an embodiment, two-level scaling combines fine-grained per-vector scale factors and coarse-grained scale factors to maintain good accuracy while improving energy efficiency and area efficiency. In an embodiment, a single (i.e., the same) coarse-grained scale factor is used for both weights and activations. In another embodiment, separate coarse-grained scale factors are used for the weights and activations.

DNNs have achieved accuracy on a range of tasks, including image classification, object detection, machine translation, and natural language processing (NLP). In parallel, hardware designers strive to achieve the best performance per watt for running DNN inference on devices ranging from the edge to the datacenter. While most DNN models are trained in single precision floating-point, the DNN models can be deployed for inference in lower-precision formats such as low bitwidth floating-point, fixed-point, and integer depending on the target device and application specifications. Quantizing DNN models to lower precisions enables acceleration of compute-bound operations such as convolution on high-throughput low-cost math units, conservation of memory bandwidth for memory-bound computations such as fully-connected layers, and reduces storage requirements in on-chip buffers and caches.

A DNN comprises multiple layers that are a cascaded set of pattern recognition filters trained for execution of a particular task. The DNN layers may include, but are not limited to, convolutional layers, non-linear scalar operator layers, fully-connected layers, and layers that downsample the intermediate data—for example by pooling. The scaling and quantization techniques that are described can apply to any neural network architecture that includes large multi-dimensional tensors (e.g. transformers, multi-layer perceptrons, Generative Adversarial Networks, U-Nets, etc.). In the following description, the scaling and quantization techniques are described in the context of convolutional neural networks (CNNs) and this is not intended to be limiting. The convolutional layers represent the core of the CNN computation and are characterized by a set of filters that are usually 1×1 or 3×3, and occasionally 5×5 or larger. The values of these filters are the weights that may be learned using a training dataset for a particular task.

The core operation in a CNN layer is a two-dimensional sliding-window convolution of an R×S element filter or kernel over a H×W element input activation plane to produce a H×W element output activation plane. There can be multiple (C) input activation planes, which are referred to as input channels. A distinct kernel is applied to each input activation channel, and the kernel output for each of the C channels are accumulated together element-wise into a single output activation plane. Multiple kernels (K) can be applied to the same body of input activations to produce K output channels of output activations. Finally, a batch of length N of groups of C channels of input activation planes can be applied to the same volume of kernel weights.

FIG. 1A is a conceptual diagram 100 illustrating per-vector parameters that may be scaled for convolution computations, suitable for use in implementing some embodiments of the present disclosure. A convolution operator 102 applies K kernels (C×R×S) of a weight tensor 103 to an input activation tensor 101 (C×H×W) to produce an output activation tensor 104.

Quantization scales high-precision values of a particular range to lower-precision values of a different range. For mapping a high-precision number x to a lower-precision number, $$x_q, x_q = Q\left(\frac{x}{s}, N\right)$$

where s is the scale factor and Q(a, b) is the function that quantizes a to a b-bit integer. Therefore, scale factors play an important role in determining the quantization error which affects the ultimate accuracy of the quantized neural network model. Conventionally, to avoid overloading the quantized neural network model with too many scale factors and nullifying the compute and memory benefits of quantization, scale factors are shared among multiple tensor elements.

Typically, scale factors are shared at a coarse granularity by elements of an entire tensor or a large sub-tensor. For example, conventionally, a single scale factor may be used for the entire input activation tensor 101 and another scale factor may be used for each kernel of the weight tensor 103. While coarse-grained scaling amortizes the cost of scaling across many elements, it likely requires mapping a broader range of values to the specified low-precision representation. The resulting increase in quantization error introduces significant accuracy loss for low-precision representations. The problem is exacerbated for DNNs whose input activations and/or weight values span a wide dynamic range.

Rather than using a single scale factor for an entire tensor or kernel, quantization may instead be performed using fine-grained per-vector scale factors to mitigate quantization-related accuracy loss. In contrast to coarse-grained per-layer/per-output-channel scaling, per-vector quantization employs a scale factor for each vector of parameters 105 (V×1×1) in the input activation tensor 101 and/or weight tensor 103 as shown in FIG. 1A. The vector size V determines the number of elements (e.g., parameter values) that are included in each vector of parameters 105. Each vector of parameters 105 includes V elements in a single dimension of the multi-dimensional parameter tensors. As shown in FIG. 1A, the vector of parameters 105 are in the dimension C. Specifically, the elements in the vector of parameters 105 for the input activation tensor 101 each share the same position (e.g., coordinate) in the H and W dimensions, so that only the position in the C dimension varies for each element. In another embodiment, the vector of parameters 105 includes elements in a different dimension of the multi-dimensional parameter tensors. When the V is less than the number of elements in the single dimension, the parameter values in the single dimension are separated into multiple vectors and a separate per-vector scale factor is associated with each one of the multiple vectors.

The finer granularity at the vector level allows more precise scale factors to be determined based on local distribution of tensor parameter values in each vector of parameters 105. More precise scaling reduces quantization error and decreases the need for a sophisticated algorithm to compute the scale factors. Moreover, in an embodiment, the unit (V) of a vector matches the unit of vector multiply-accumulate (MAC) hardware circuitry in a DNN accelerator. Such hardware-software synergy based on the vector size leads to an elegant extension of current accelerator architecture for implementing per-vector scaling with low overhead.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Integer quantization maps high-precision floating-point weights and activations in a DNN to low-precision representations, typically with 8 or fewer bits. In the context of the following description, the floating-point weights and activations are collectively referred to as real values, and the quantized low-precision weights and activations collectively referred to as integer values. While the techniques are described for uniform integer quantization, where the values are evenly distributed within the range of the integer format, the techniques are not limited to uniform integer quantization and may also be applied to non-uniform quantization such as logarithmic quantization.

There are several considerations when deciding how to quantize real values into integers. First, a range of real values to be represented is determined so that any value out-of-range will be clipped. It is not necessarily to determine the full range of presented real values, but rather, the range is chosen to clip outliers and improve the precision of quantized values within the range where most values reside. Second, the number of bits available for the integer values is determined. With more integer bits, more discrete levels (integer values) are available to represent the same range of real values, resulting in smaller quantization error.

An N-bit signed two's complement integer quantization maps real values $x \in |x_{min}, x_{max}|$ to values $x_q \in [-2^{N-1}, 2^{N-1}-1]$. In general, a positive real scale factor s is used to scale the value from the real range to the integer range, and a zero point z represents the integer value corresponding to a real zero value. Because the zero point complicates the integer computation pipeline, an efficient DNN typically applies symmetric scale-only quantization assuming z=0, $x_{min}=-x_{max}$, and $x_q \in [-2^{N-1}+1, 2^{N-1}-1]$. Using symmetric scale-only quantization with $\alpha=x_{max}|$, $$s = \frac{\alpha}{2^{N-1}-1} \qquad \text{Eq. (1)}$$

$$x_q = \text{clip}\left(\left\lfloor \frac{x}{s} \right\rceil, -2^{N-1}+1, 2^{N-1}-1\right) \qquad \text{Eq. (2)}$$

If x is unsigned, $x_{min}=0$ and $x_q$ will be clipped to the integer range of $[0, 2^{N-1}-1]$. To avoid issues with vanishing gradient, quantized integer values $x_q$ are avoided during training. Instead, simulated quantization using discrete real values may be applied to simulate the effect of integer quantization. Equation 3 defines the simulated-quantized value $x_q^s$ as a real value rescaled by the original scale factor from the integer value.

$$x_q^s = s \cdot x_q \qquad \text{Eq. (3)}$$

Typically, in a convolutional layer, a scale factor for weights or activations is determined for every layer of the neural network. Known as per-layer scaling, a single scale factor is used for each weight tensor 103 (i.e., K×C×R×S), and another scale factor is used for each input activation tensor 101 (i.e., C×H×W). To improve accuracy, multiple scale factors are determined for the weights of each layer. Known as per-channel scaling, a different scale factor is used for each output channel of a layer (i.e., C×R×S). In the context of the following description per-layer and per-channel scaling is collectively referred to as coarse-grained scaling.

Scale factors should be chosen carefully to best approximate a real distribution with a limited number of discrete values. As a result, a calibration process is used to select the a used in Equation 1 for quantizing weights and activations. While a can be set to the maximum absolute value of the distribution (called max calibration), it is often beneficial to omit outlier values in favor of additional precision for inlier values. For example, percentile calibration sets a to a specific fraction of $|x_{max}|$. Entropy calibration, on the other hand, determines the a that minimizes the information loss between real and quantized distributions. For weights, scale factors may be determined using static calibration prior to inferencing. For activations, the scale factors may be determined using static calibration prior to inferencing or through dynamic calibration during inferencing. Note that static calibration for activations requires some samples of representative data to model the distribution of inputs that the neural network is likely to encounter during inferencing.

As previously described, fine-grained or per-vector scaled quantization may mitigate the accuracy loss from quantization. Rather than computing a single scale factor over an entire tensor or multiple dimensions of a tensor, a scale factor is applied for each vector of parameters 105 within a single dimension of a tensor. For a convolutional layer shown in FIG. 1A, per-vector scaling subdivides the input channel (C) dimension of the weight tensor 103 or the input activation tensor 101 into [C/V] vectors of parameters 105, each with V elements, where each C dimension can now be viewed as a V×[C/V] tensor. The number of vectors contained within a tensor depends on its shape and the designated vector size V.

The quality of per-vector scaling depends on the vector size parameter. At one extreme with V=1, each element would be individually quantized with its own scale factor and thus experience no loss in precision. At the other extreme with V=C, elements in each (R, S) in the weight tensor 103 and (H, W) in the input activation tensor 101 would share the same scale factor. Though at a much coarser granularity than V=1, V=C remains at a much finer granularity than that of per-tensor or per-kernel and is expected to carry more precise quantization. In an embodiment, V is greater than one and less than C.

TABLE 1 compares the accuracy of a 6-bit quantized ResNet50 neural network model with per-vector scaling for different vector sizes. Larger values indicate greater accuracy.

TABLE 1

Accuracy of a Neural Network model using different vector sizes

| V = 1 | V = 2 | V = 4 | V = 8 | V = 16 | V = 32 | V = 64 |
|---|---|---|---|---|---|---|
| 76.13 | 76.08 | 76.05 | 76.05 | 76.00 | 75.96 | 75.96 |

It is expected and illustrated in TABLE 1 that accuracy decreases with increasing vector size. Therefore, V should be selected to minimize the required number of scale factors (maximize vector size) while maximizing the precision of the vector-scaled approximation and resulting network accuracy.

Before being processed by a layer of the neural network, the weights and/or input activations are quantized. In an embodiment, to perform the convolution operation, a set of vector MAC units accepts one or more vectors of quantized weights (weight vectors) and one or more vectors of quantized input activations (activation vectors). Each vector MAC within the set is configured to generate a dot product from one quantized input activation vector and one quantized weight vector.

Figure 1B:
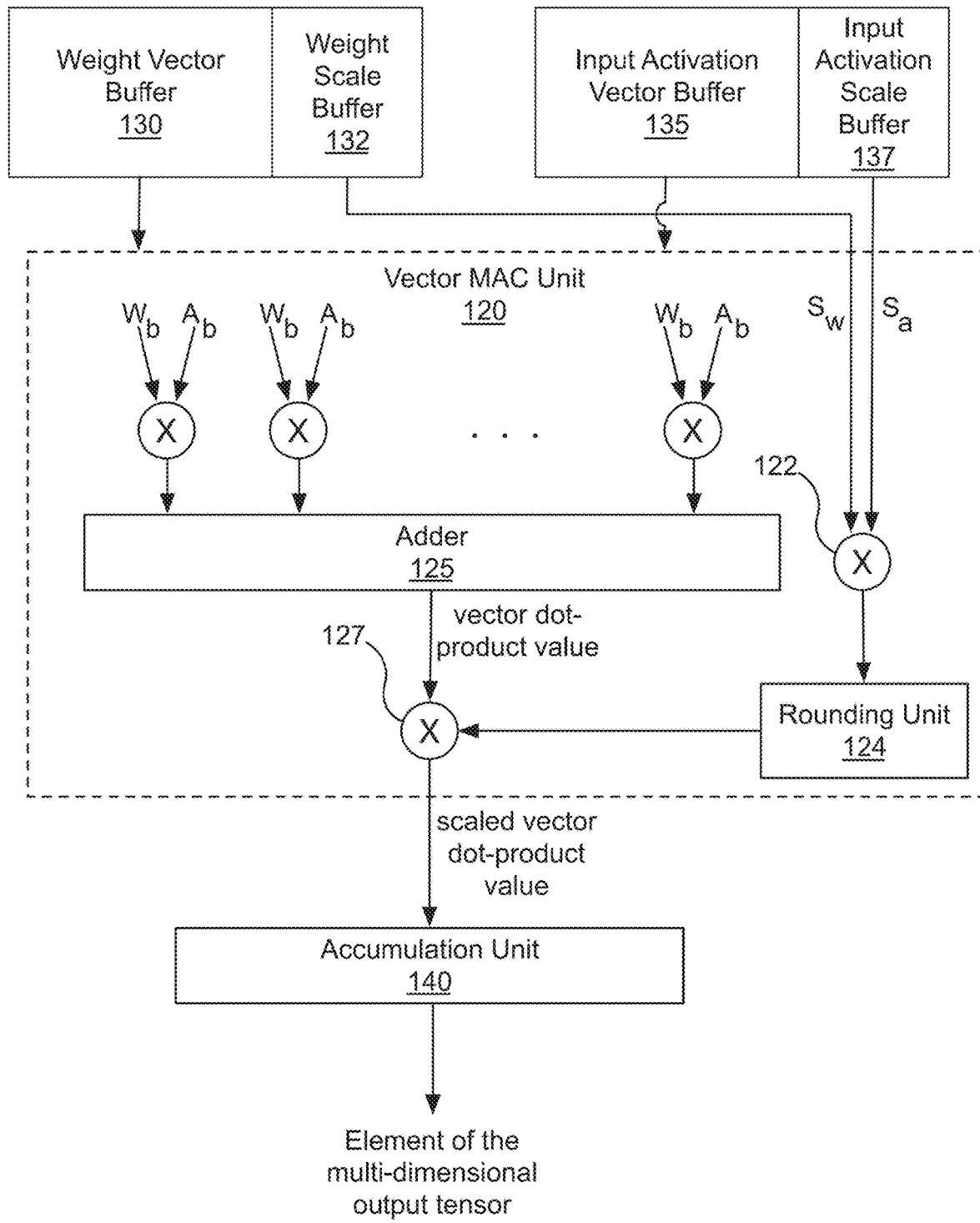
FIG. 1B illustrates a block diagram of a vector multiply-accumulate unit suitable for use in implementing some embodiments of the present disclosure.

FIG. 1B illustrates a block diagram of a vector multiply-accumulate (MAC) unit 120 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the vector MAC unit 120 is within the scope and spirit of embodiments of the present disclosure.

In addition to improving accuracy, the vector granularity for quantizing and scaling also maps naturally to the vector unit of compute in typical DNN accelerators. Because convolution and linear layers can be conveniently expressed as a collection of dot-products between an unrolled region of weights and an unrolled region of activations, vector-MAC units are the building blocks of many DNN processing architectures. Equation 4 shows the dot-product y(j) between the jth vector region of weights (w(j)(i), i∈[0, V−1] and the jth vector region of activations a(j)(i), i∈[0, V−1].

$$y(j) = \sum_{i=0}^{V-1}(w(j)(i) \cdot a(j)(i)) \quad \text{Eq. (4)}$$

As shown in FIG. 1B, a vector MAC unit 120 receives a weight vector of N-bit quantized weight values from a weight vector buffer 130. The vector MAC unit 120 also receives an input activation vector of N-bit quantized input activation values from an input activation vector buffer 135. The weight scale factor is stored in a weight scale buffer 132 and the activation scale factor is stored in an input activation scale buffer 137. The per-vector scale factors can be a low-bitwidth integer, floating-point, or power-of-two format value. Note that the power-of-two implementation reverts to block floating-point with a per-element mantissa and an exponent that is shared across the vector.

In another embodiment, the weight vector buffer 130 stores both the quantized weights and the corresponding weight scale factor. In an embodiment, the weight vector buffer 130 includes multiple entries and stores a different weight vector (and weight scale factor) in each entry of the weight vector buffer 130. In another embodiment, the input activation vector buffer 135 stores both the quantized input activations and the corresponding input activation scale factor. In an embodiment, the input activation vector buffer 135 includes multiple entries and stores a different input activation vector (and input activation scale factor) in each entry of the input activation vector buffer 135. Storing the M-bit scale factors in the weight scale buffer 132 and the input activation scale buffer 137 results in an M/V·N overhead. With the appropriate vector size V for given N and M, per-vector scale factor overhead can be much lower compared with the overhead of introducing additional bits to represent weights and activations. For example, the storage overhead is 6.25% for N=M=4 and V=16.

In an embodiment, each vector includes V elements and the vector MAC unit 120 includes V multipliers. Each element in the weight vector is multiplied with each element in the activation vector to produce products. The products are summed by an adder 125 to produce a vector dot-product value or partial sum. In an embodiment, the quantized weights and input activations are represented in an integer format. The vector dot-product value output by the adder 125 has a width of 2N+$\log_2$V for N-bit weights and activations.

The vector MAC unit 120 also receives per-vector scale factors for each of the weight and input activation vectors. A scale factor $s_w(j)$ is computed for the jth weight vector and a scale factor $s_a(j)$ is computed for the jth activation vector to scale the quantized integer weights $w_q(j)(i)$, i∈[0, V−1] and integer activations $a_q(j)(i)$, i∈[0, V−1], Therefore, the dot-product in Equation 4 becomes the scaled dot-product in Equation 5.

$$y_q^s(j) = \left(\sum_{i=0}^{V-1}(w_q(i)a_q(i))\right)s_w(j)s_a(j) \quad \text{Eq. (5)}$$

Note that the scale factors are factored out of each vector MAC operation, leading to a simple hardware implementation when the products are summed and then the resulting vector dot-product value is scaled, as shown in FIG. 1B. Compared to coarse-grained scaling, per-vector scaling requires scaling the dot-product by the products of the per-vector (e.g., fine-grained) scale factors, which represents an extra (2N+log(V))×M multiplication for each vector dot-product.

A multiplier 122 multiplies the weight and input activation scale factors to produce a scale product factor $s_w(j)s_a(j)$ that may be rounded to a desired precision by a rounding unit 124. In an embodiment, the scale product factor is computed and rounded in parallel with computation of the vector dot-product value. In an embodiment, the scale product factor is unchanged by the rounding unit 124. In another embodiment, the scale product factor is truncated by the rounding unit 124.

A multiplier 127, multiplies the vector dot-product value by the scale product factor to increase the number of bits representing the vector dot-product value, producing a scaled vector dot-product value. In an embodiment, increasing M and/or N may increase the precision of the output activations. The scaled vector dot-product value output by the vector MAC unit 120 has a width of $2N+\log_2 V+2M$ for M-bit weight and activation scale factors. In an embodiment, the rounding unit 124 may round the scale product factor to fewer than 2 Mbits. In an embodiment, the scaled vector dot-product value produced by the multiplier 127 is rounded or truncated before being input to the accumulation unit 140. The scaled vector dot-product value is accumulated by an accumulation unit 140 with partial output activation that is a sum of previously generated scaled dot-product values which contribute to the same element in the output activation tensor. The accumulation unit 140 should include enough bits or should include saturating arithmetic to avoid overflow. When all of the weight and input activations have been processed by the vector MAC unit 120, the output activation tensor is complete. In an embodiment, the accumulation unit 140 includes at least an adder and a storage register.

Figure 1C:
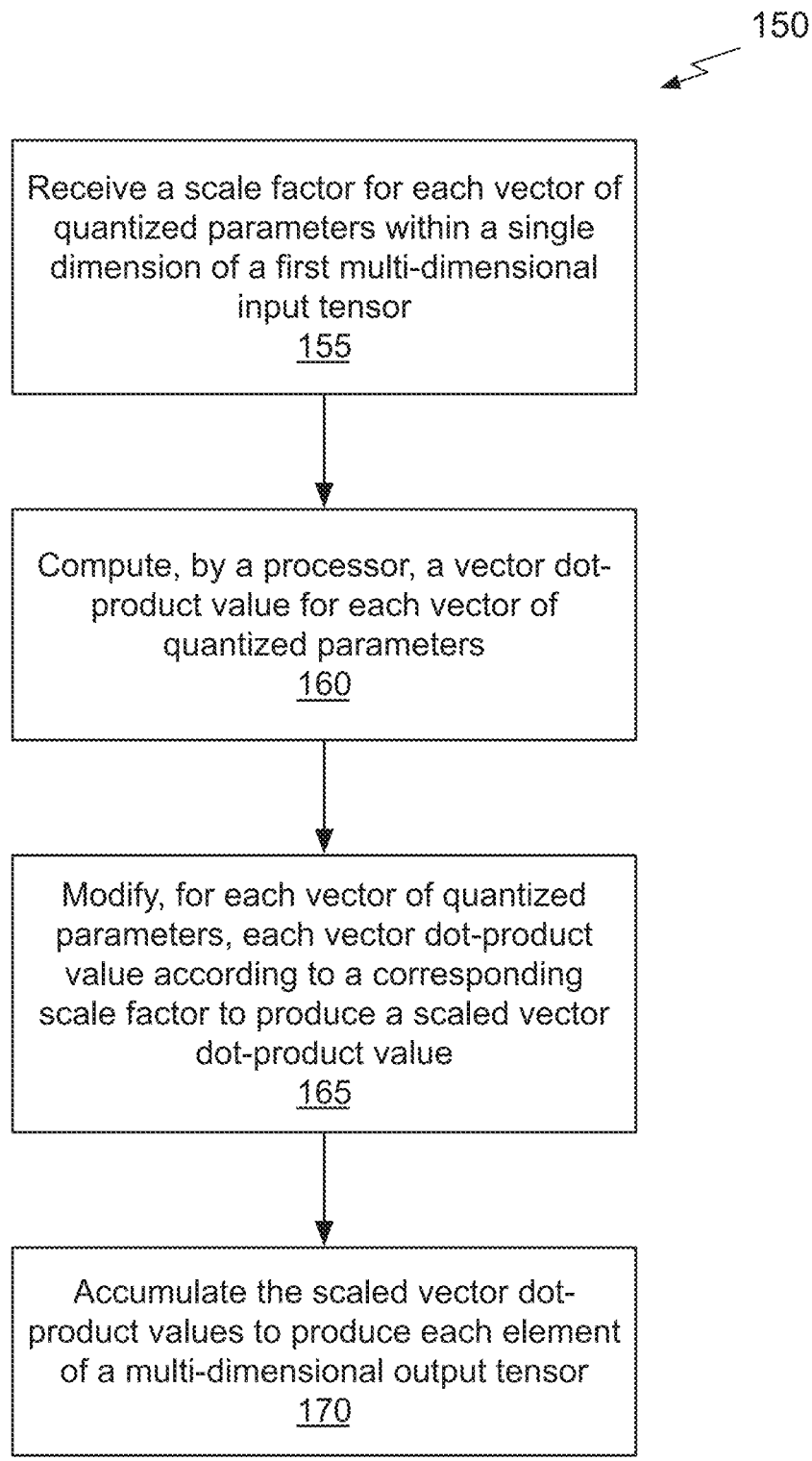
FIG. 1C illustrates a flowchart of a method for per-vector scaling of parameters for neural network models, in accordance with an embodiment.

FIG. 1C illustrates a flowchart of a method 150 for per-vector scaling of parameters for neural network models, in accordance with an embodiment. Each block of method 150, described herein, comprises a computing process that may be performed using any combination of hardware, firmware, and/or software. For instance, various functions may be carried out by a processor executing instructions stored in memory. The method 150 may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the system of FIG. 1B. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, a scale factor is received for each vector of parameters within a single dimension of a first multi-dimensional parameter input tensor. In an embodiment, the parameters are at least one of weights or input activations. In an embodiment the first multi-dimensional parameter input tensor comprises first inputs that are weights and a second multi-dimensional parameter input tensor comprises second inputs that are input activations. In an embodiment the first multi-dimensional parameter input tensor comprises first inputs that are input activations and a second multi-dimensional parameter input tensor comprises second inputs that are weights.

In an embodiment, the weights and/or input activations are quantized according to per-vector scale factors. In an embodiment, the scale factor includes separate scale factors—a first that is calculated for each quantized vector of weights and a second that is calculated for each quantized vector of input activations. In an embodiment, the scale factor is calculated for each quantized vector of weights and the input activation vector parameters are not quantized using a per-vector scale factor. In an embodiment, the scale factor is calculated for each quantized vector of input activations and the weight vector parameters are not quantized using a per-vector scale factor. As described further herein, the scale factors may be determined statically (e.g., offline or not during inferencing) or dynamically during inferencing. Furthermore, static scale factors may be determined during and/or after training. In an embodiment, the scale factor includes a per-vector scale factor and coarse-grained scale factor that is shared by at least two vectors in the single dimension. In other words, a two-level scale factor includes a fine-grained per-vector portion and a coarse-grained portion.

At step 160, a processor computes a vector dot-product value is computed for each vector of quantized parameters. In an embodiment, the processor is configured to implement a neural network model and the multi-dimensional output tensor is generated for a layer of the neural network model. In an embodiment, the vector dot-product value is computed within the vector MAC unit 120. In an embodiment, vector dot-product values are computed based on Equation 4.

At step 165, for each vector of quantized parameters, each vector dot-product value is modified according to a corresponding scale factor to produce a scaled vector dot-product value. In an embodiment, separate per-vector scale factors are received for the quantized weight vector and the quantized input activation vector and the vector dot-product value is multiplied by both of the per-vector scale factors to produce the scaled vector dot-product value. In an embodiment, a product of the separate per-vector scale factors is computed and rounded before being used to modify the vector dot-product value. In an embodiment, only per-vector weight scale factors are received and the vector dot-product value is multiplied by the per-vector weight scale factors to produce the scaled vector dot-product value. In an embodiment, only per-vector input activation scale factors are received and the vector dot-product value is multiplied by the per-vector input activation scale factors to produce the scaled vector dot-product value. In an embodiment, each vector dot-product value is modified by shifting the vector dot-product value, according to the corresponding scale factor, to produce the scaled vector dot-product value. In an embodiment, each vector dot-product value is modified, according to the corresponding scale factor, to produce the scaled vector dot-product value. In an embodiment, the bitwidth of the vector dot-product value increases as a result of the scaling. In another embodiment, the bitwidth of the vector dot-product value is unchanged as a result of the scaling.

At step 170, the scaled vector dot-product values are accumulated to produce each element of a multi-dimensional output tensor. In an embodiment, the accumulation unit 140 accumulates the scaled vector dot-product values to produce each element of the multi-dimensional output tensor. In an embodiment, the multi-dimensional output tensor is an output activation tensor.

When the multi-dimensional output tensor that is computed will be processed by a subsequent layer in the neural network, the multi-dimensional tensor is an output activation tensor that is used as an input activation tensor to the subsequent layer. Assuming that the input activations are quantized, the computed output activation tensor is quantized to convert the higher-precision output activations back to N-bit vector elements with per-vector scale factors for the next layer. In an embodiment, per-vector activation scale factors are computed for the output activation tensor.

Figure 2A:
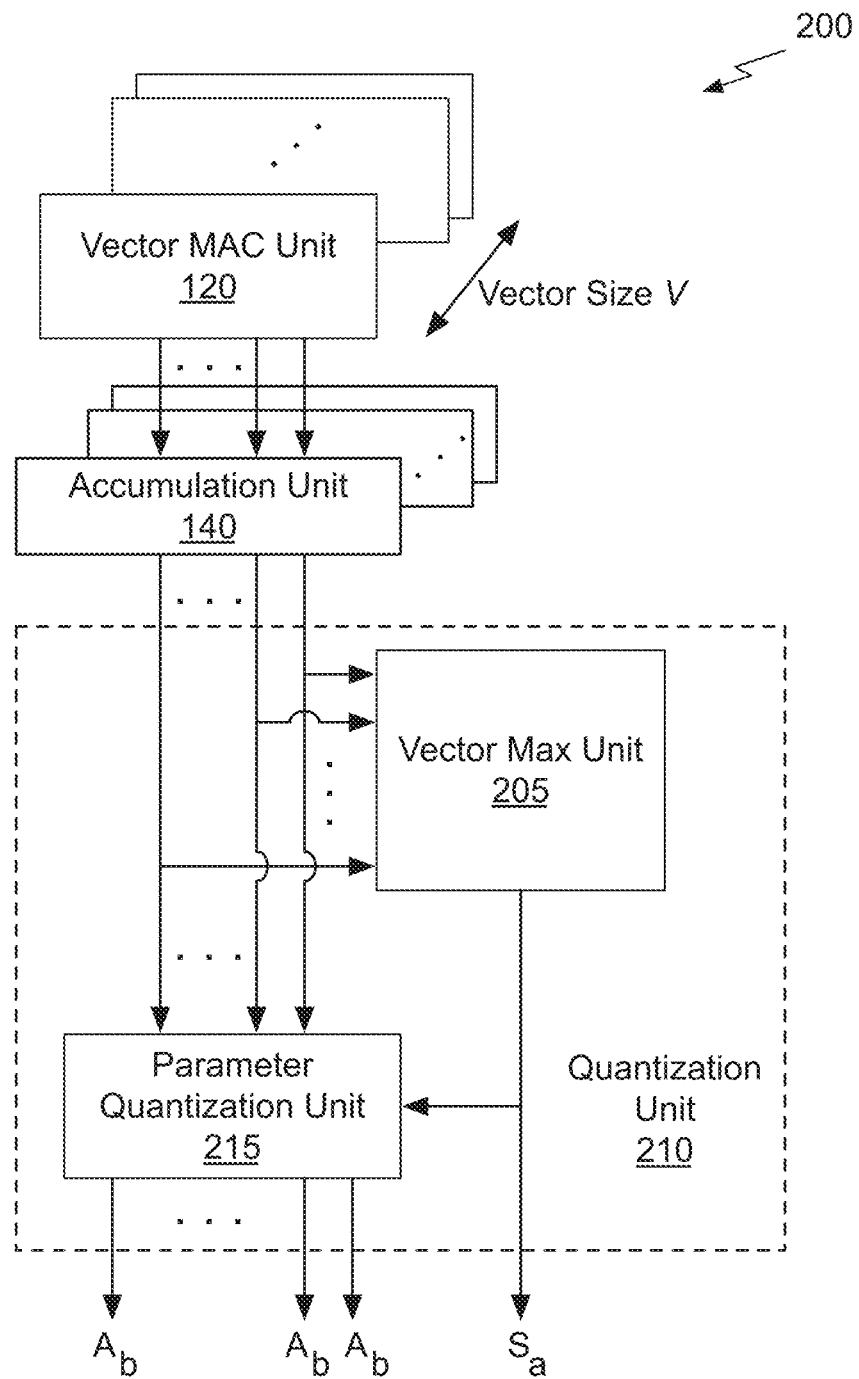
FIG. 2A illustrates a block diagram of a computation unit suitable for use in implementing some embodiments of the present disclosure.

FIG. 2A illustrates a block diagram of a computation unit 200 suitable for use in implementing some embodiments of the present disclosure. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the computation unit 200 is within the scope and spirit of embodiments of the present disclosure.

The computation unit 200 includes a plurality of vector MAC units 120, a plurality of accumulation units 140, and a quantization unit 210. In an embodiment, the computation unit 200 includes V vector MAC units 120 and V accumulation units 140. To implemented dynamic calibration for the activation scale factors, the quantization unit 210 receives a vector of output activations and computes the corresponding activation scale factor. The quantization unit 210 includes a vector max unit 205 and a parameter quantization unit 215. Dynamic calibration may be performed for each layer of a neural network. Specifically, dynamic calibration is performed once for each vector of output activations of the multi-dimensional output activation tensor 104, where the elements within each vector are aligned in the single dimension.

The vector max unit 205 receives a vector of the output activations in the single dimension of the multi-dimensional output tensor and performs a calibration operation to compute a scale factor for the vector. In an embodiment, the vector max unit 205 determines a maximum absolute value of the parameters in the vector (max), $\alpha=|x_{max}|$. The vector max unit 205 then calculates the scale factor using Equation (1) when the output activations are represented as signed values. The scale factor is calculated as $$s = \frac{\alpha}{2^N - 1}$$

when the output activations are represented as unsigned values. In other embodiments, a different function may be used to compute the scale factor. For example, other calibration techniques are percentile and entropy based rather than maximum absolute value based. However, when the number of elements in each vector V is a small number, the distribution of values within the vector may lack enough samples to support the percentile and entropy calibration techniques to determine a statistically useful $\alpha$.

The parameter quantization unit 215 divides each one of the output activations in the vector by the scale factor provided by the vector max unit 205 to quantize each output activation back to the N-bit format for input to the next layer of the neural network. In an embodiment, the parameter quantization unit 215 uses Equation (2) to reduce the precision of each parameter. In an embodiment, the division operation is performed directly in integer format. In another embodiment, the output activations and scale factor are represented in floating-point format (converted from integer if necessary) and fast floating-point division is performed to quantize each output activation to the lower precision.

Figure 2B:
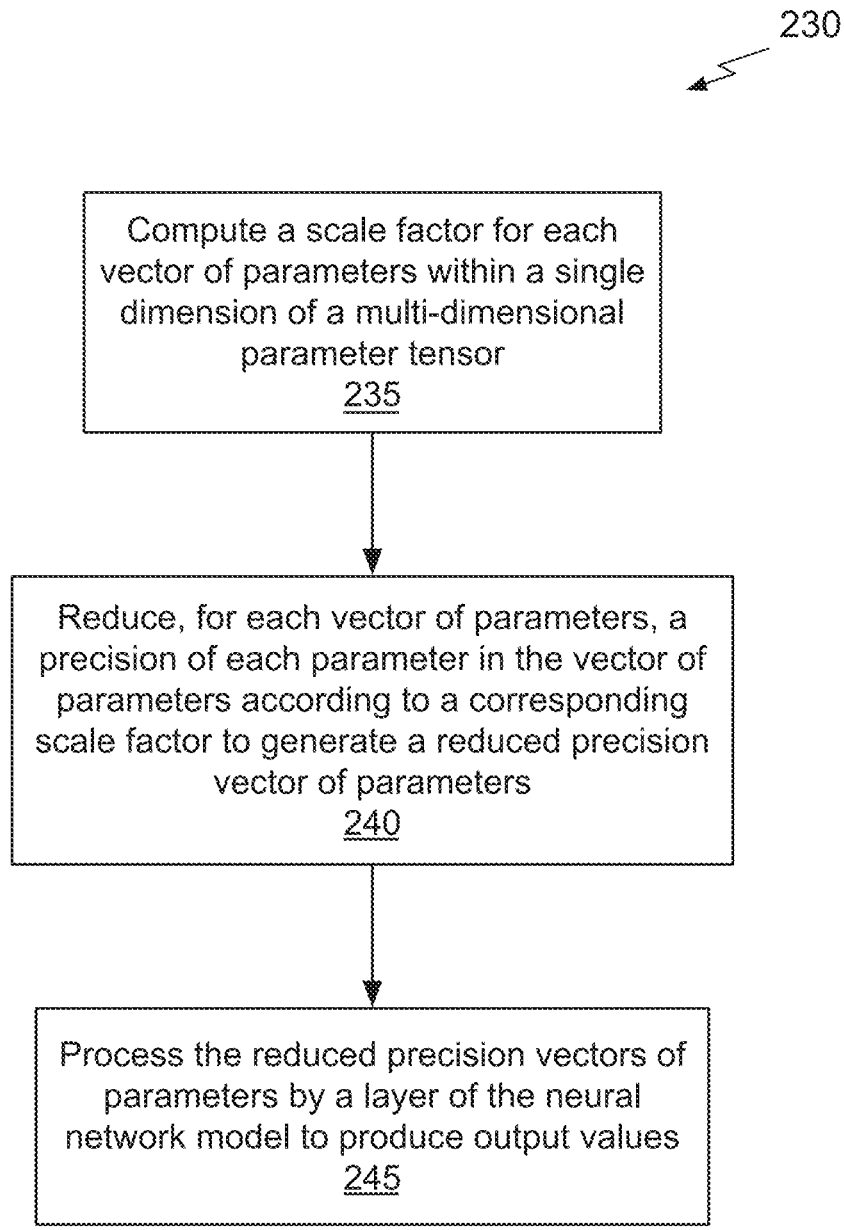
FIG. 2B illustrates a flowchart of a method for per-vector quantization of parameters for neural network models, in accordance with an embodiment.

FIG. 2B illustrates a flowchart of a method 230 for per-vector quantization of parameters for neural network models, in accordance with an embodiment. Each block of method 230, described herein, comprises a computing process that may be performed using any combination of hardware, firmware, and/or software. For instance, various functions may be carried out by a processor executing instructions stored in memory. The method 230 may also be embodied as computer-usable instructions stored on computer storage media. The method may be provided by a standalone application, a service or hosted service (standalone or in combination with another hosted service), or a plug-in to another product, to name a few. In addition, method 230 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 230 is within the scope and spirit of embodiments of the present disclosure.

At step 235, a scale factor is computed for each vector of parameters within a single dimension of a multi-dimensional parameter tensor to produce a plurality of scale factors for the multi-dimensional parameter tensor. In an embodiment, the scale factor is dynamically computed by the vector max unit 205. In an embodiment, the parameters are at least one of output activations, input activations, or weights. In an embodiment, the parameters are output activations and the scale factors are dynamically calculated during inferencing for at least a layer of the neural network model. In an embodiment, the scale factors are determined during and/or after training of the neural network and are therefore pre-computed for use during inferencing.

As previously described, the per-vector activation scale factors $s_a(j)$ may be dynamically calibrated during inferencing, based on the range of real values to be represented. The per-vector activation scale factors may be dynamically calibrated by calculating each per-vector scale factor as the output activation vectors are produced for a layer. In an embodiment, instead of being dynamically computed, the activation scale factors $s_a(j)$ are computed statically with data samples that are representative of typical activations. In other words, the activation scale factors may be precalculated based on the activation that are determined during training.

In an embodiment, the weight scale factors $s_w(j)$ are determined statically based on the trained model. Using static (max) calibration for weights and dynamic (max) calibration for activations has the potential to achieve significantly better accuracy using low bitwidths. In one example, compared to a floating-point baseline, per-vector scaled quantization achieves a negligible reduction in accuracy at 6 bits and less than 1% reduction at 4 bits. In comparison, per-channel scaled quantization requires at least 8-bit weights for less than a 1% reduction.

One method to quantize a DNN model is through quantization-aware training (QAT). QAT either trains the neural network model from scratch or fine-tunes the trained full-precision neural network model, with quantization operations included in the neural network model. In an embodiment, the weights and weight scale factors are calculated during QAT. In an embodiment, the input activations and activation scale factors are calculated during QAT.

Alternatively, post-training quantization (PTQ), such as the dynamic calibration performed by the quantization unit 210, directly quantizes the values of the full-precision neural network model before and during inferencing without any retraining. Often, PTQ is more desirable because it avoids access to the complete set of possibly confidential training data, eliminates lengthy fine-tuning, requires little hyperparameter tuning, and provides a turnkey solution for quantizing any DNN. However, PTQ usually results in more accuracy loss than QAT because of the lack of training with quantizers in the loop. With both QAT and PTQ, accuracy loss from quantization varies by precision, model, and quantization algorithm.

The scaling granularity also influences the accuracy loss. While per-channel scaling achieves better accuracy than per-layer scaling, coarse-grained scaling generally leads to significant accuracy degradation for a range of quantized models. With PTQ but without QAT, accuracy degradation is observed in popular image recognition and language models after quantization. Even for neural network models where coarse-grained scaling can be competitive, careful calibration of the scale factor with the right calibration technique is typically required for good accuracy.

In an embodiment, per-vector PTQ maintains reasonable accuracy down to three bits. When QAT is not applied, some accuracy loss may be unavoidable at low precisions compared with a full-precision baseline. In an embodiment a pre-trained neural network model is fine-tuned with quantization in the loop for only a limited number of iterations to adapt the weights and activations for a quantized neural network model of a specific configuration. Furthermore, per-vector scaling is not limited to PTQ and can also be applied to QAT to achieve even higher accuracy for a given set of bit widths.

Returning to FIG. 2B, at step 240, for each vector of parameters, a precision of each parameter in the vector of parameters is reduced according to a corresponding scale factor to generate a reduced precision (e.g., quantized) vector of parameters. In an embodiment, the parameter quantization unit 215 reduces the precision of each parameter in the vector according to the corresponding scale factor provided by the vector max unit 205. At step 245, the reduced precision vectors of parameters are processed by a layer of the neural network model to produce output values. In an embodiment, the output values are output activations.

Per-Vector Processing Element

To perform convolution operations, multiple per-vector processing elements, such as the computation unit 200 may be implemented in parallel so that the entire output activation tensor 104 may be computed simultaneously. However, an alternative, is to implement a smaller number of per-vector processing elements to produce the entire output activation tensor 104 over multiple execution cycles. Efficient data reuse across all three data types may be achieved by: (i) sharing each input activation vector or weight vector spatially across multiple vector MAC units 120; (ii) registering input activation vectors or weight vectors for temporal reuse across multiple cycles; (iii) reusing partial sums can be spatially inside the vector MAC unit 120 and temporally in the accumulation unit 140.

Figure 2C:
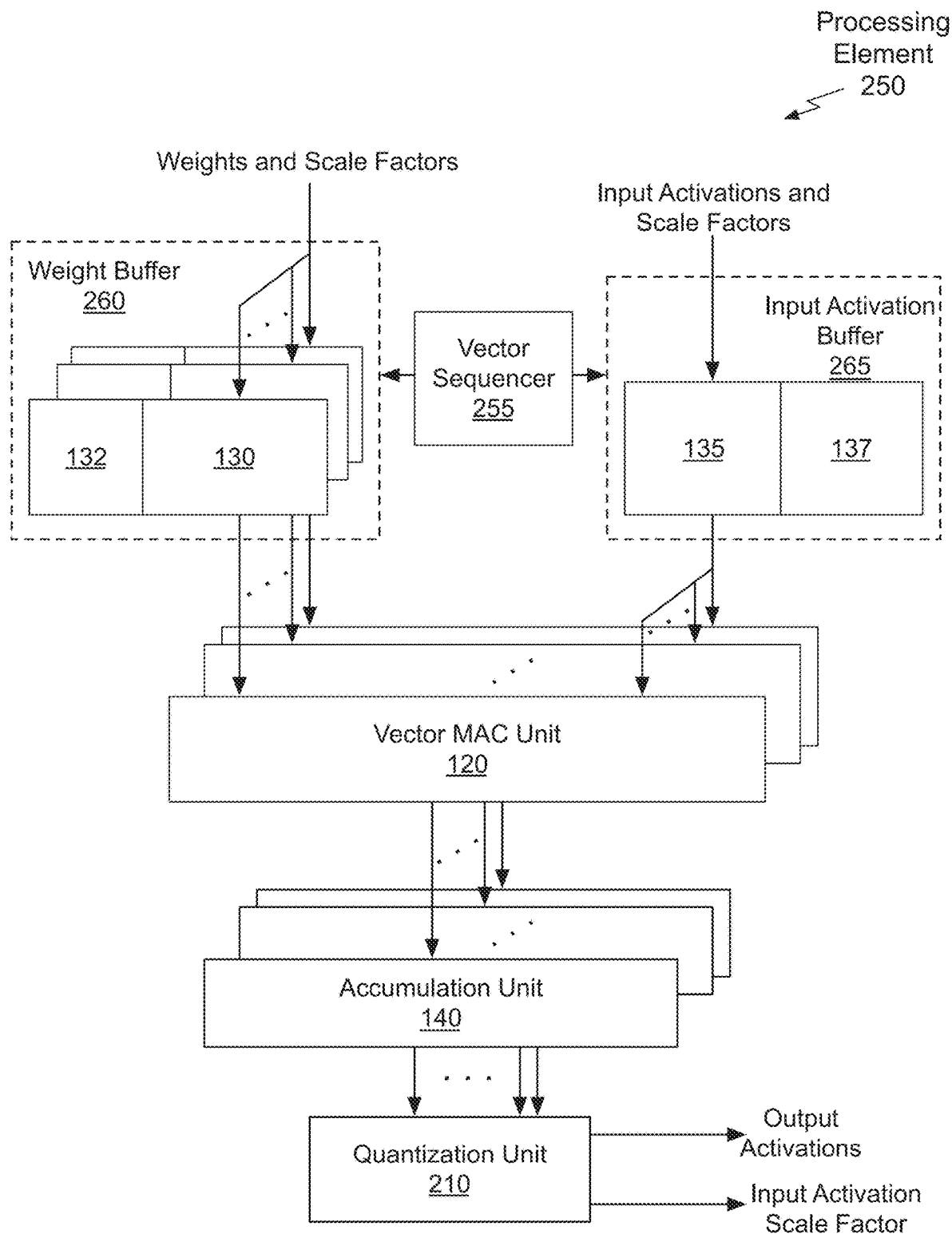
FIG. 2C illustrates a block diagram of a processing element suitable for use in implementing some embodiments of the present disclosure.

FIG. 2C illustrates a block diagram of a processing element 250 suitable for use in implementing some embodiments of the present disclosure. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the processing element 250 is within the scope and spirit of embodiments of the present disclosure. A weight buffer 260 includes the weight scale buffer 132 and the weight vector buffer 130. An input buffer 265 includes the input activation vector buffer 135 and the input activation scale buffer 137.

A vector sequencer 255 reads the weights and outputs weight vectors to be multiplied by the vector MAC units 120. In one embodiment, the vector sequencer 255 broadcasts an input activation vector to each vector MAC unit 120 and sends different weight vectors to each vector MAC unit 120. The weight vectors are reused across multiple cycles to perform dot=products with different input activation vectors in the vector MAC unit 120. The outputs of the vector MAC unit 120 are temporally accumulated across multiple cycles in the accumulation unit 140 to achieve partial sum reuse.

In one embodiment (not shown), the vector sequencer 255 broadcasts a weight vector to each vector MAC unit 120 and sequences through multiple activation vectors before broadcasting another weight vector. Products generated by the multipliers within each vector MAC unit 120 are accumulated to produce intermediate values (e.g., scaled vector dot-product values) that become the output activations after one or more iterations. The accumulation unit 140 updates the partial output activations stored in the accumulation unit 140. Each scaled vector dot-product value is accumulated with a partial output activation at the output coordinates in the output activation space that matches (i.e., equals) a position associated with the scaled vector dot-product value. When the output activations for a neural network layer have been computed and quantized by the quantization unit 210, the vector sequencer 255 may proceed to process a next layer by applying the output activations as input activations.

The processing element 250 achieves efficient data reuse across all the three data types: (i) the input activation vector is shared spatially across multiple vector MAC units 120; (ii) each weight vector may be read from the weight buffer 260 and reused temporally across multiple cycles; (iii) scaled vector dot-product values (e.g., scaled partial sums) are reused spatially inside the vector MAC unit 120 and temporally in the accumulation units 140.

To improve area and energy efficiency, a two-level scaling scheme may be used that further applies integer quantization on the per-vector scale factors. For two-level scaling, the per-vector scale factor s in Equation 2 is factored into the product of an integer per-vector scale factor $s_q$ and a floating-point coarse-grained scale factor $\gamma$, as shown in Equation 6.

$$x_q^{2s} = s_q \cdot \gamma \cdot x_q \qquad \text{Eq. (6)}$$

Here $x_q^{2s}$ denotes the simulated-quantized values with a two-level scale factor. With an integer scale factor per-vector, only an integer is stored for each vector of parameters in a multi-dimensional tensor. Furthermore, all vector-wise computations can be completed with integer arithmetic. With the two-level scaling technique, the more expensive floating-point scale factors are pushed to the coarser granularity by introducing the less expensive integer scale factors at the finer granularity to achieve a balance between accuracy and hardware efficiency.

Equations 7a-7j below detail the algorithm for determining the scale factors when quantizing a real valued tensor x to an N-bit signed integer. Index i indicates each vector; index j represents each element of a vector; and k is the index along the coarse-grained dimension with different coarse-grained scale factors. Assuming per-kernel coarse-grained scale factors for the weight tensor of a convolutional layer, $k \in [0, K-1]$ while $i \in [0, [C/V]-1]$ and $j \in [0, V-1]$. First, floating-point scale factors are computed at a per-vector granularity. Then, the per-vector scale factors are quantized by separating them into integer per-vector components and a per-coarse-grained-region floating-point component. The datatype of each tensor may be specified in Equation 7 as fp for floating-point and int for integer.

$$x_{max}(k, i)_{fp} = \max_j |x(k, j, i)| \qquad \text{Eq. (7a)}$$

$$s(k, i)_{fp} = \frac{x_{max}(k, i)}{(2^{N-1} - 1)} \qquad \text{Eq. (7b)}$$

-continued $$x_q(k, j, i)_{int} = \left\lfloor \frac{x(k, j, i)}{s(k, i)} \right\rfloor \quad \text{Eq. (7c)}$$

$$x^s_{q1fp} = x_q(k, j, i)s(k, i) \quad \text{Eq. (7d)}$$

$$s_{max}(k)_{fp} = \max_i s(k, i) \quad \text{Eq. (7e)}$$

$$\gamma(k)_{fp} = \frac{s_{max}(k)}{2^M - 1} \quad \text{Eq. (7f)}$$

$$s_q(k, i)_{int} = \left\lfloor \frac{s(k, i)}{\gamma(k)} \right\rfloor \quad \text{Eq. (7g)}$$

$$s_{q2}(k, i)_{fp} = s_q(k, i)\gamma(k) \quad \text{Eq. (7h)}$$

$$x^s_{q2}(k, j, i) = x_q(k, j, i)s_{q2}(k, i) \quad \text{Eq. (7i)}$$

$$= x_q(k, j, i)s_q(k, i)\gamma(k) \quad \text{Eq. (7j)}$$

To determine the per-vector scale factors, the algorithm computes the absolute maximum over the elements $j \in [0, V-1]$ of each vector (k,i) in Equation 7a and then determines the floating-point per-vector scale factor that would scale the absolute maximum to the maximum representable N-bit signed integer. This step is analogous to Equation 1, but at a per-vector granularity. Equation 7c performs the actual per-vector scaling and rounds the resulting tensor values to integers which may be used in the vector MAC unit 120. Note that the scale factor here is per-vector for each (k,i) but broadcasted correspondingly to each element (k,j,i) of the tensor. Equation 7c may be used to perform a single-level quantization with floating-point scale factors per-vector. The single-level simulated-quantized value is expressed in Equation 7d.

To further quantize the scale factor, the quantization process of taking the absolute maximum is repeated, computing the ratio of real valued maximum to integer maximum, and scaling and rounding to integer on the single-level scale factor as shown in Equations 7e to 7g. Equation 7h shows the two-level scale factor as a composition of integer per-vector scale factor and floating-point coarse-grained scale factor. The two-level simulated-quantized value is therefore represented as the product of the integer tensor values and the two levels of scale factors, as shown in Equation 7j.

Two-level scale factors may be computed for step 235 of the method 230 shown in FIG. 2B. The per-vector scale factors may be applied in step 240 and the coarse-grained scale factor(s) may be applied to the output values that are produced in step 245. The scale factors that are received for step 155 of the method 150 shown in FIG. 1C may be two-level scale factors. The per-vector scale factors may be applied to modify each vector of quantized parameters in step 165 and the coarse-grained scale factor(s) may be applied to the elements of the multi-dimensional output tensor that are produced in step 170.

Figure 3A:
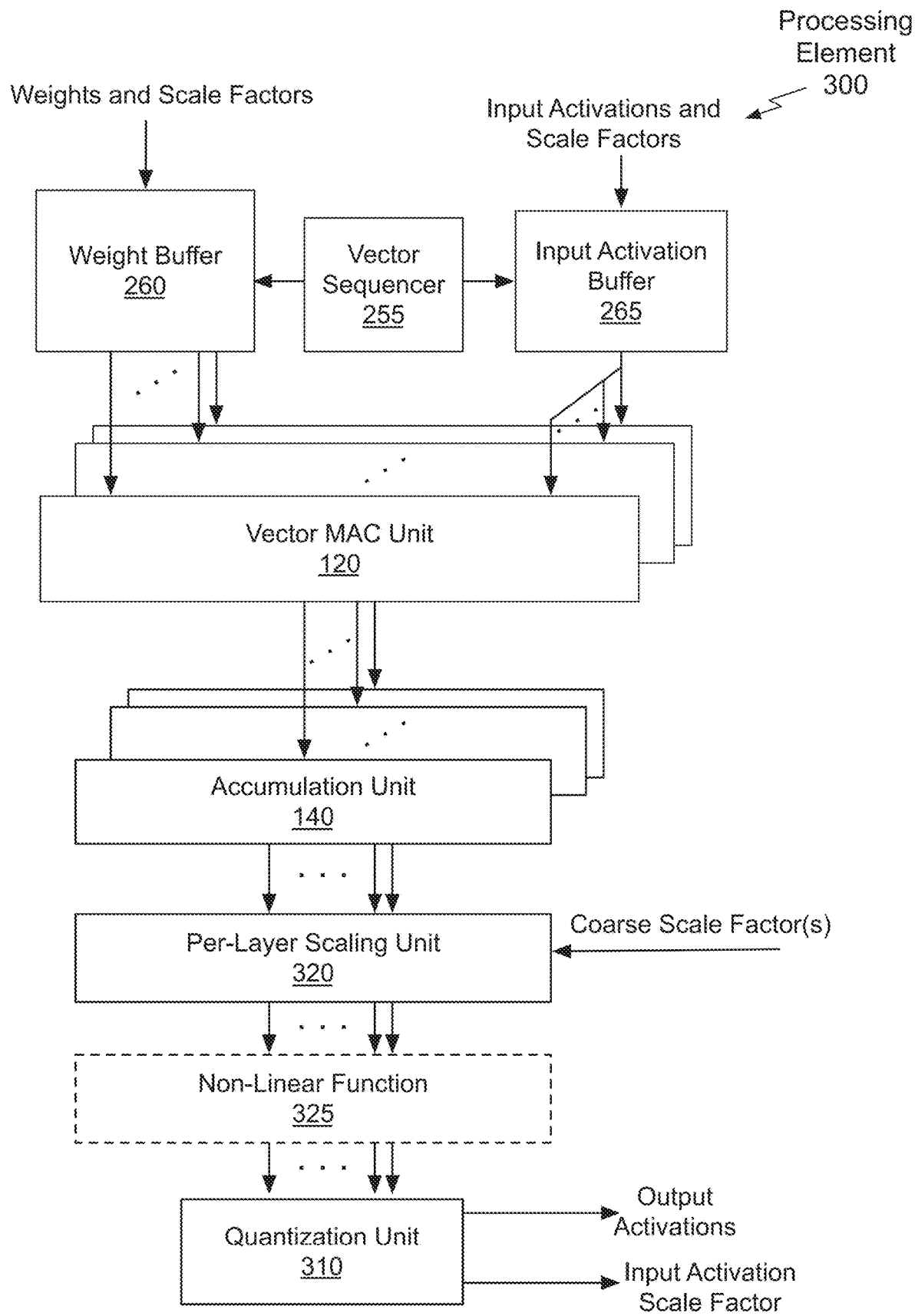
FIG. 3A illustrates another block diagram of a processing element that implements two-level quantization suitable for use in implementing some embodiments of the present disclosure.

FIG. 3A illustrates a block diagram of a processing element 300 that implements two-level quantization suitable for use in implementing some embodiments of the present disclosure. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the processing element 300 is within the scope and spirit of embodiments of the present disclosure.

Each scale factor may comprise a per-vector scale factor and a coarse (per-layer, per-channel, or per-tensor) scale factor. In an embodiment, the coarse scale factor is a second scale factor that is separate from the per-vector scale factor. In an embodiment, the per-vector scale factor is an integer format number and the coarse scale factor is a floating-point format number. The processing element 300 includes the weight buffer 260, the input activation buffer 265, and the vector sequencer 255 to provide the weight vectors, per-vector weight scale factors, input activation vectors, and per-vector input activation scale factors to the vector MAC units 120.

The scaled dot-product values generated by the vector MAC units 120 are accumulated by the accumulation units 140 to generate elements in the output activation tensor. When generation of the elements for the output activation tensor is complete, the elements are input to a per-layer scaling unit 320. The coarse scale factor is applied to each one of the elements to produce coarse scaled elements. In an embodiment, a single coarse scale factor corresponds to both the weights and input activations. In another embodiment, the coarse scale factor includes a first coarse scale factor for the weight and a second coarse scale factor for the input activations and both the first and second coarse scale factors are applied to each one of the elements to produce coarse scaled elements. Compared with the elements received by the per-layer scaling unit 320, the coarse scaled elements have greater precision.

The coarse scaled elements may be optionally processed using a non-linear function 325 before being input to a quantization unit 310. The quantization unit 310 may be configured to evaluation Equations 7a and 7b to compute the per-vector and coarse scale factors based on the coarse scaled elements. In an embodiment, the quantization unit 310 includes a reciprocal unit and shifter to compute ratios of absolute maximums of each vector of the coarse scaled elements to the maximum representable value of an N-bit integer to implement Equation 7b. In an embodiment, the ratios are the scale factors used to quantize the output activations.

The per-vector and coarse scale factors are computed for each vector of the output activations in the single dimension of the multi-dimensional output tensor. The quantization unit 310 quantizes the coarse scaled elements to produce the output activations for the layer. Quantizing the coarse scaled elements reduces a precision of each vector of the output activations in the multi-dimensional output tensor according to the per-vector scale factors and the coarse scale factors computed by the quantization unit 310.

The two-level quantization algorithm in Equation 7 is one of several ways to determine the two levels of scale factors. For example, instead of first computing the single-level per-vector scale factor and then breaking it down into the product of two levels of scale factors, the scale factors can be generated one level at a time by first computing the coarse scale factor and then back-calculating the per-vector scale factor. While the latter approach provides a larger space to explore the integer values and integer scale factors, it requires computing the absolute maximum over a larger tensor as opposed to just a vector, which may be more expensive to implement in hardware if the activations are dynamically scaled during inference. However, it could be acceptable for scaling weights statically before inference. As a result, two-level quantization algorithms present tradeoffs that need to be balanced.

Using per-vector scaling factors for quantization may achieve lower precision while maintaining needed accuracy.

While there are V weights and V activations for each vector MAC unit 120, only one weight scale factor and one activation scale factor are needed because they are shared across all V weights and activations. Furthermore, the dot-product operations can be performed at lower precision for the quantized values, which may offset the overhead from additional multiplication operations to scale the vector dot-product values. As a result, the per-vector and/or two-level quantization techniques offer a tradeoff between additional multipliers and scale factor storage with low precision dot-product computation and narrow weight/activation vector storage.

TABLE 2 illustrates the accuracy for different DNN models (ResNet50, BERT-base, and BERT-large) with floating-point per-vector scale factors. In TABLE 2, Wt=3 and Act=3U indicate 3-bit signed weights and 3-bit unsigned activations. Wt=3 and Act=8 indicate 3-bit signed weights and 8-bit signed activations. Weights+Activations, Weights Only, and Activations Only indicate per-vector scaled quantization on both weights and activations, weights only, and activations only, respectively. Best Per-Channel indicates the best calibrated per-channel scaled accuracy among several different calibration methods (e.g., maximum absolute value, KL-divergence, mean squared error, etc.). Other than a few of the Weights Only bitwidths, the per-vector scaled quantization provides improved accuracy compared with the best per-channel quantization.

TABLE 2

Accuracy for different DNN models

| Model | Bitwidths | Weights + Activations | Weights Only | Activations Only | Best Per-Channel |
|---|---|---|---|---|---|
| ResNet50 | Wt = 3 Act = 3U | 69.78 | 38.01 | 9.76 | 7.97 |
| | Wt = 4 Act = 4U | 75.28 | 72.88 | 72.18 | 70.76 |
| | Wt = 6 Act = 6U | 76.00 | 75.91 | 75.87 | 75.80 |
| | Wt = 8 Act = 8U | 76.15 | 76.17 | 76.10 | 76.16 |
| BERT-base | Wt = 3 Act = 8 | 82.84 | 47.22 | 12.37 | 11.03 |
| | Wt = 4 Act = 8 | 86.24 | 65.52 | 80.58 | 73.61 |
| | Wt = 6 Act = 8 | 86.66 | 70.66 | 86.48 | 80.18 |
| | Wt = 8 Act = 8 | 86.60 | 70.42 | 86.63 | 81.25 |
| BERT-large | Wt = 3 Act = 8 | 89.56 | 78.59 | 9.27 | 8.71 |
| | Wt = 4 Act = 8 | 90.64 | 83.53 | 87.54 | 83.18 |
| | Wt = 6 Act = 8 | 90.77 | 83.9 | 90.60 | 88.90 |
| | Wt = 8 Act = 8 | 90.80 | 84.20 | 90.85 | 89.41 |

Figure 3B:
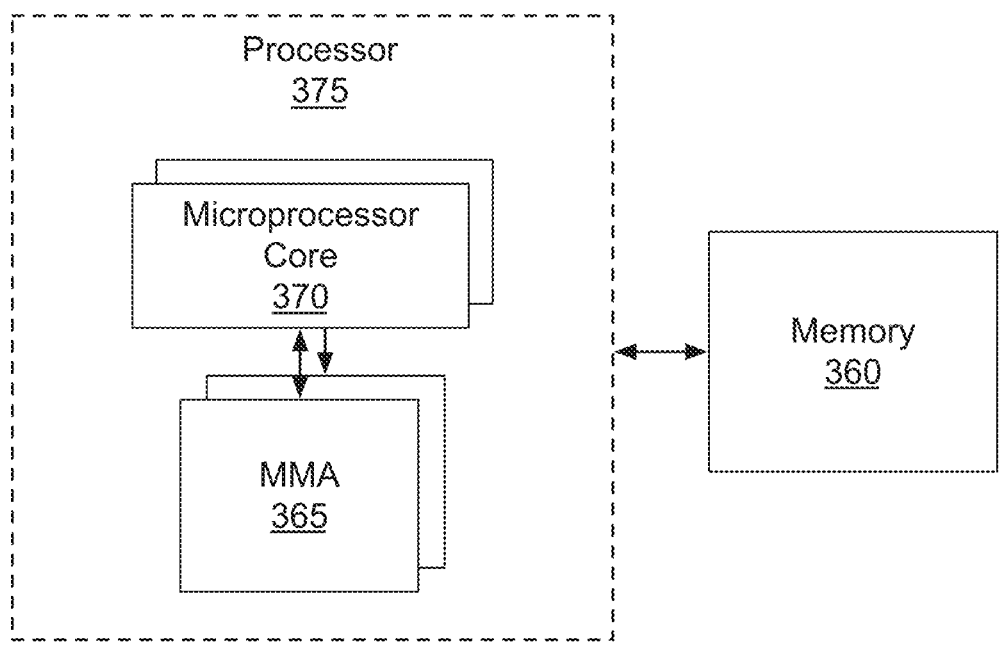
FIG. 3B illustrates a block diagram of a processor suitable for use in implementing some embodiments of the present disclosure.

FIG. 3B illustrates a block diagram of a processor 375 suitable for use in implementing some embodiments of the present disclosure. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the processor 375 is within the scope and spirit of embodiments of the present disclosure.

The processor 375 is coupled to memory 360 and includes a plurality of microprocessor cores 370 and a plurality of matrix multiply-accumulators (MMAs) 365. In an embodiment, the MMA 365 may include or be replaced with tensor cores, matrix multiply accelerators, or tensor processing units. In an embodiment, the memory 360 may comprise a number of dynamic random access memory (DRAM) devices. The DRAM devices may be configured as a high-bandwidth memory (HBM) subsystem, with multiple DRAM dies stacked within each device. The memory 360 may store weights, activations, and scale factors. The microprocessor cores 370 and MMAs 365 may be configured to implement a neural network that uses quantized weights and/or activations. Specifically, the microprocessor cores 370 and/or MMAs 365 may implement at least portions of the PE 250 and/or 300, at least portions of the vector MAC unit 120 for accelerating matrix multiplies with per-vector scaling, or at least portions of the quantization unit 210.

Figure 3C:
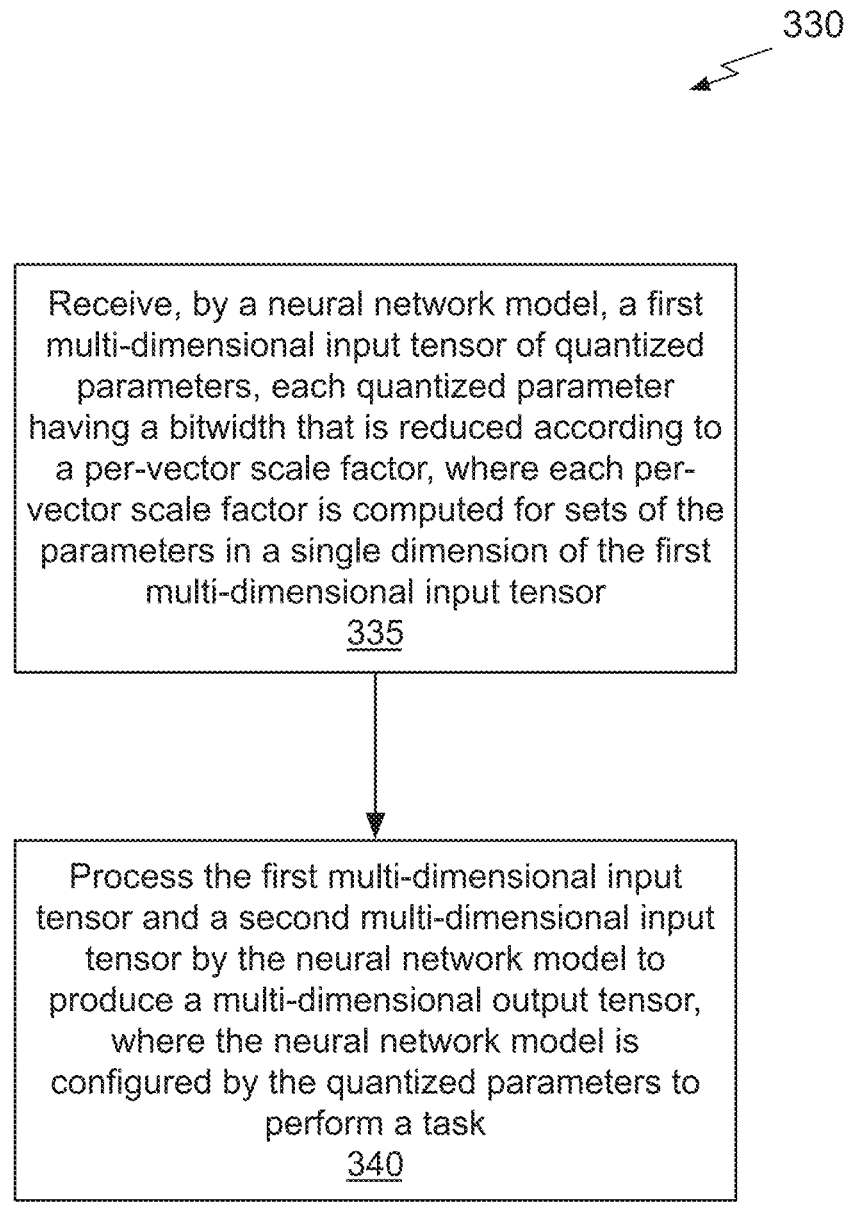
FIG. 3C illustrates a flowchart of a method for processing multi-dimensional tensors using per-vector scale factors, in accordance with an embodiment.

FIG. 3C illustrates a flowchart of a method 330 for processing multi-dimensional tensors using per-vector scale factors, in accordance with an embodiment. Each block of method 330, described herein, comprises a computing process that may be performed using any combination of hardware, firmware, and/or software. For instance, various functions may be carried out by a processor executing instructions stored in memory. The method 330 may also be embodied as computer-usable instructions stored on computer storage media. The method may be provided by a standalone application, a service or hosted service (standalone or in combination with another hosted service), or a plug-in to another product, to name a few. In addition, method 330 is described, by way of example, with respect to the system of FIG. 2A and/or the processing element of FIG. 2C or 3A. However, this method may additionally or alternatively be executed by any one system, or any combination of systems, including, but not limited to, those described herein. Furthermore, persons of ordinary skill in the art will understand that any system that performs method 330 is within the scope and spirit of embodiments of the present disclosure.

At step 335, a neural network model receives a first multi-dimensional input tensor of quantized parameters. In an embodiment, the quantized parameters are input activations or weights. Each quantized parameter has a bitwidth that is reduced according to at least a per-vector scale factor, where each per-vector scale factor is computed for sets of the parameters in a single dimension of the first multi-dimensional input tensor.

At step 340, the neural network processes the first multi-dimensional input tensor and a second multi-dimensional input tensor to produce a multi-dimensional output tensor, where the neural network model is configured by the quantized parameters to perform a task. In an embodiment, the task is at least one of segmentation and/or classification. In an embodiment, the task is speech recognition, text recognition, navigation, autonomous vehicle control, analysis of sensor-acquired data, and the like.

Figure 3D:
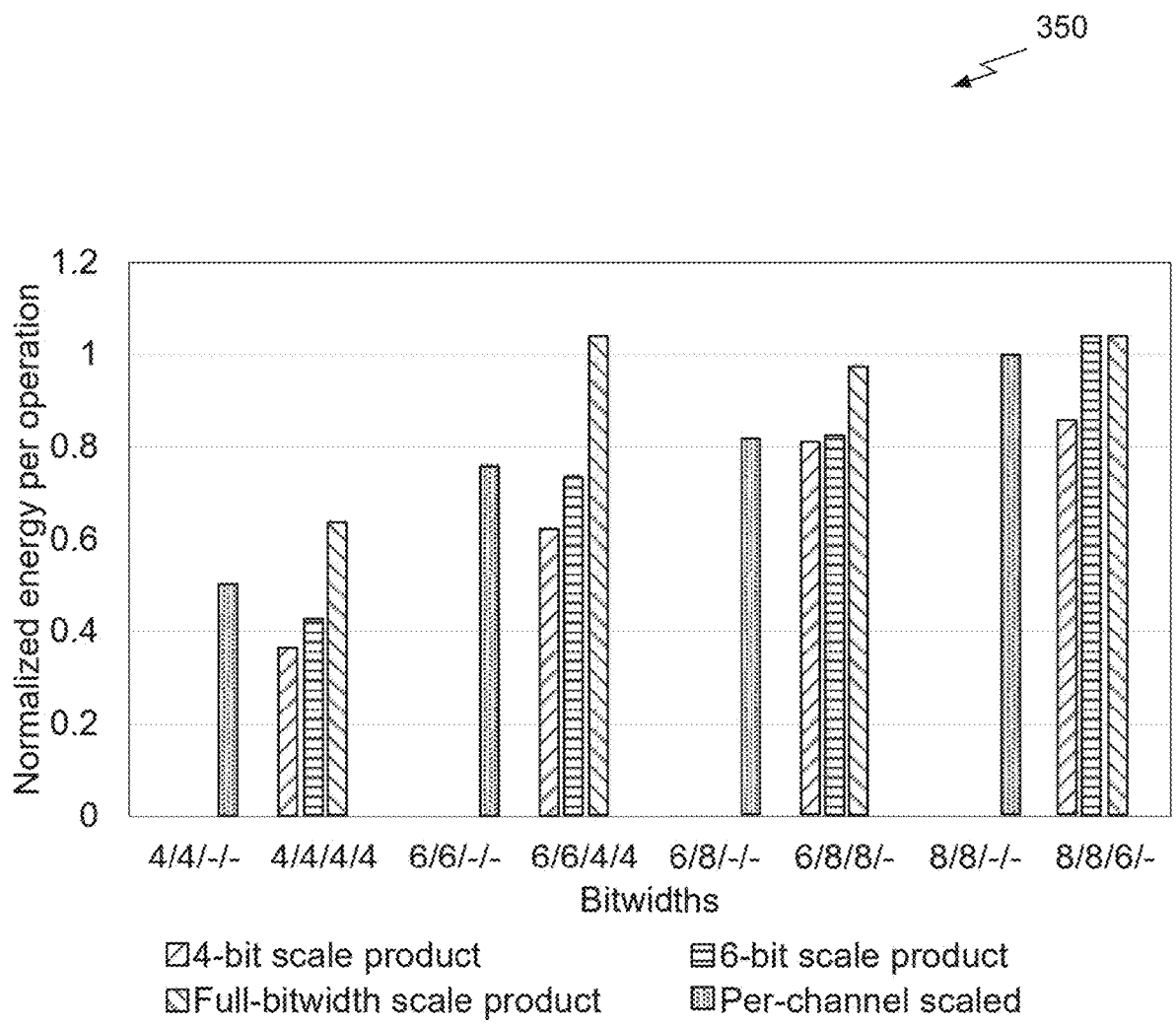
FIG. 3D is a graph illustrating the effect of scale product bitwidth on energy, in accordance with an embodiment.

FIG. 3D is a graph 350 illustrating the effect of scale product bitwidth on energy, in accordance with an embodiment. A hardware implementation of two-level scaling (per-vector, per-layer) is evaluated to produce the results shown in the graph 350. The graph 350 shows significant decrease in energy per operation going from full-bitwidth scale product to 4-bit or 6-bit products. In the graph 350, W/A/ws/as denotes each configuration, where W stands for weight bitwidth, A for activation bitwidth, ws for weight scale bitwidth, and as for activation scale bitwidth. "-" indicates use of per-channel scaling. The energy is normalized to that of the 8/8/-/- configuration.

The bars for the per-channel scaled configurations (4/4/-/-, 6/6/-/-, 6/8/-/-, 8/8/-/-) show that quantization can achieve up to 2× energy savings over an 8-bit baseline. When the PE 300 is used and the scale factor product ($s_w \times s_a$) is kept at full-bitwidth precision (i.e., no rounding), the bars for the 4/4/4/ and 6/6/4/4/ configurations show modest energy overheads at 4-bit and 6-bit weight and activation precisions over corresponding per-channel scaled configurations due to additional multipliers for scaling and wider accumulation widths. When the scale factor product is rounded to an intermediate size of 4 bits or 6 bits, the energy overheads of adding scaling and quantization support to the hardware can be substantially reduced, as demonstrated by the corresponding bars. In fact, scale factor rounding truncates many small values and converts them to zero, thereby providing opportunities for data gating of costly accumulation operations. As a result, the configurations with scale product rounding can achieve lower energy consumption compared to even the per-channel scaled configurations. The 8/8/6/- configuration shows the same energy for 6-bit scale and full-bitwidth scale products because the full-bitwidth is exactly 6 bits as a result of using a 6-bit per-vector weight scale factor and no per-vector activation scale factor.

The per-vector scaled quantization technique employs fine-grained per-vector scale factors to mitigate accuracy loss typical in existing quantized DNN models. To efficiently implement fine-grained scaling in hardware, a two-level scaling scheme and associated algorithm that combines a set of fine-grained scale factors with each coarse-grained scale factor is described. The per-vector scaled quantization achieves significant improvement in post-training quantization accuracy when compared to conventional per-channel scaled quantization. Existing vector dot-product computation units may be modified to dynamically support per-vector scaling at inference-time. The performance, power, and area implications of per-vector scaling may be determined and balanced within the design space. Overall, per-vector scaling may provide better accuracy, energy, and/or area for many low-precision inference configurations.

Parallel Processing Architecture

Figure 4:
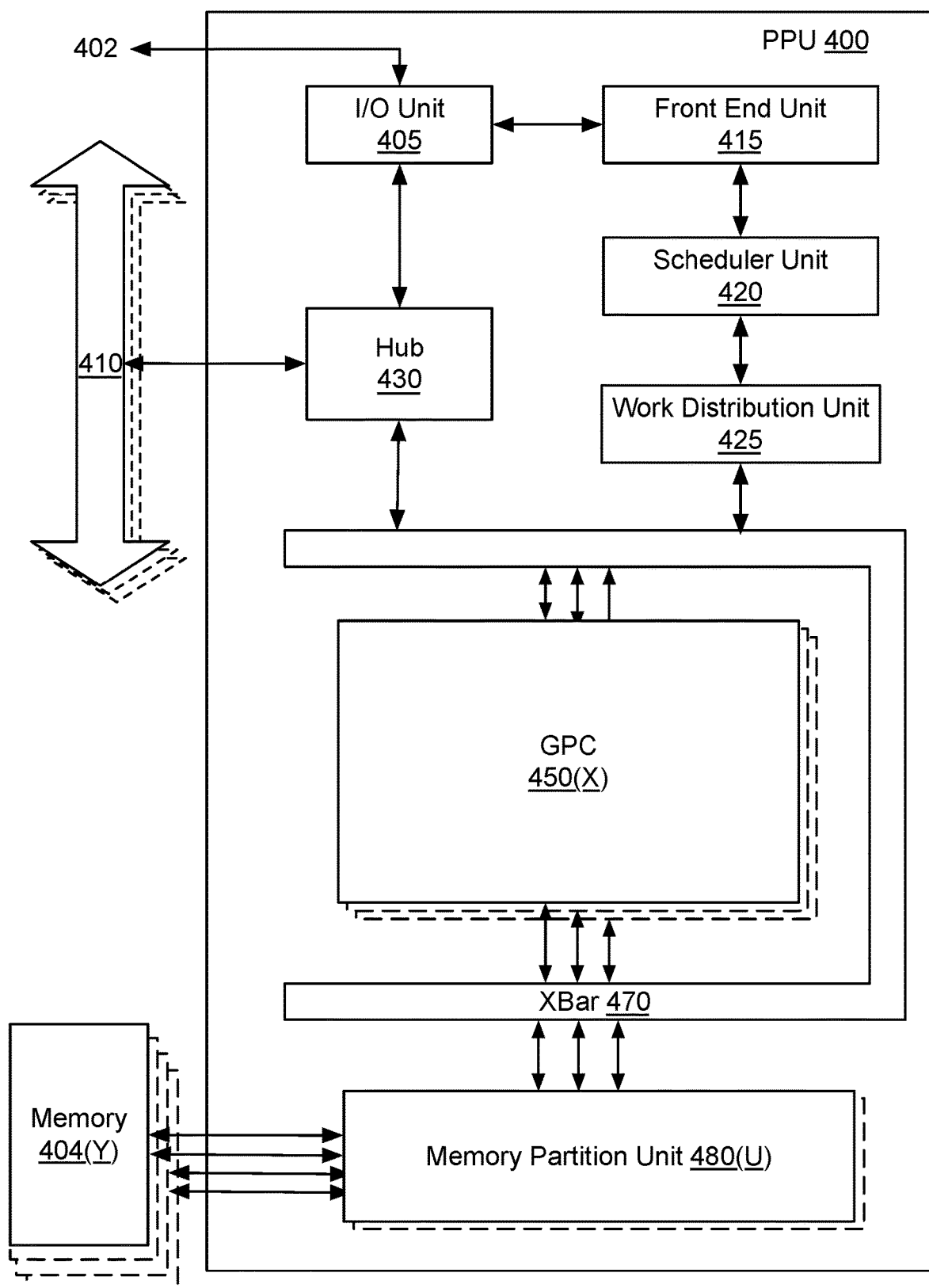
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the processing element 250 and/or 300. In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Ray Tracing (RT) Cores, Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
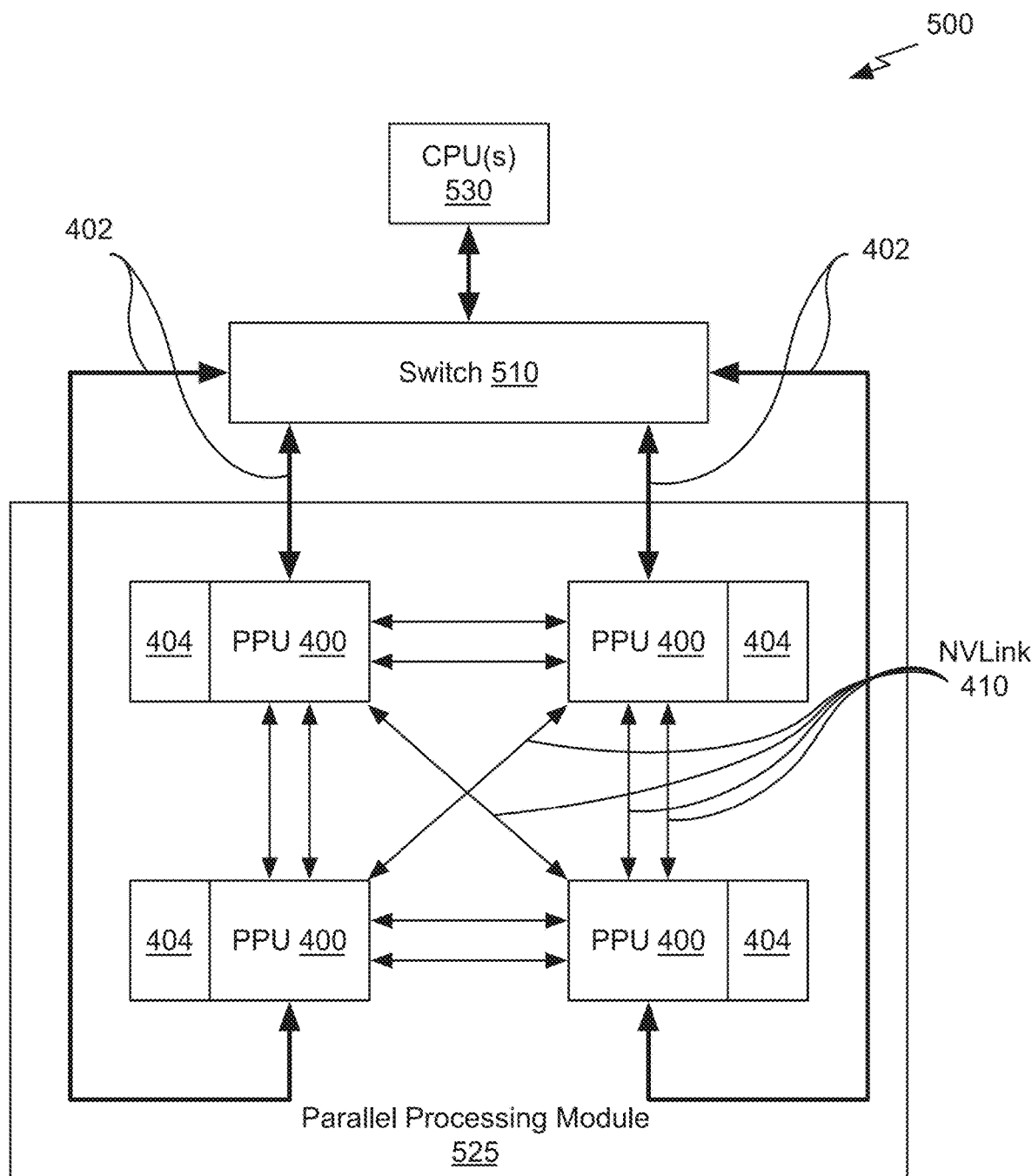
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 150 shown in FIG. 1C and/or the method 230 shown in FIG. 2B. The processing system 500 includes a CPU 530, switch 510, and multiple PPUs 400, and respective memories 404.

Figure 5B:
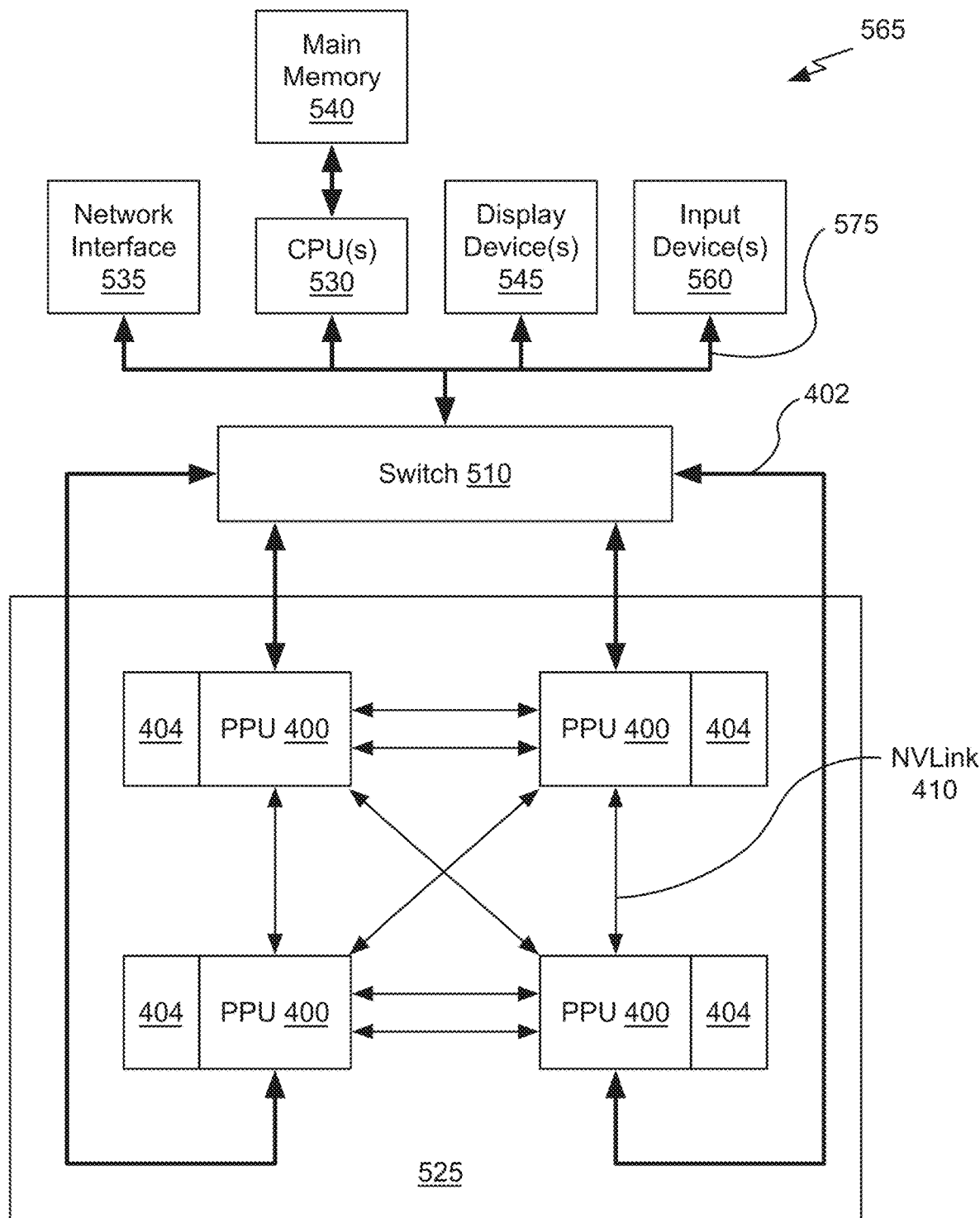
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 shown in FIG. 1C and/or the method 230 shown in FIG. 2B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, data and/or images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such data and/or images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
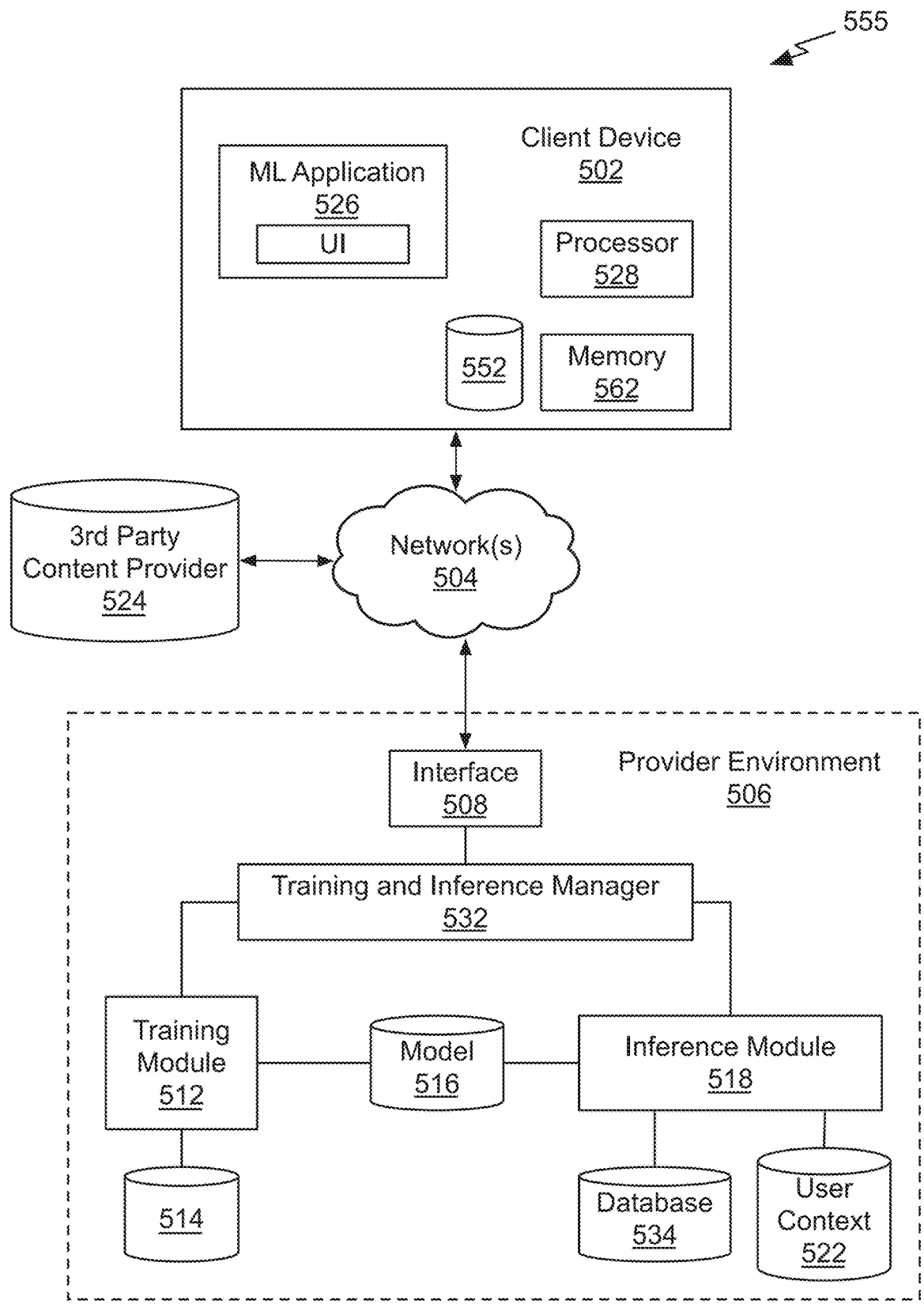
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.)

that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6:
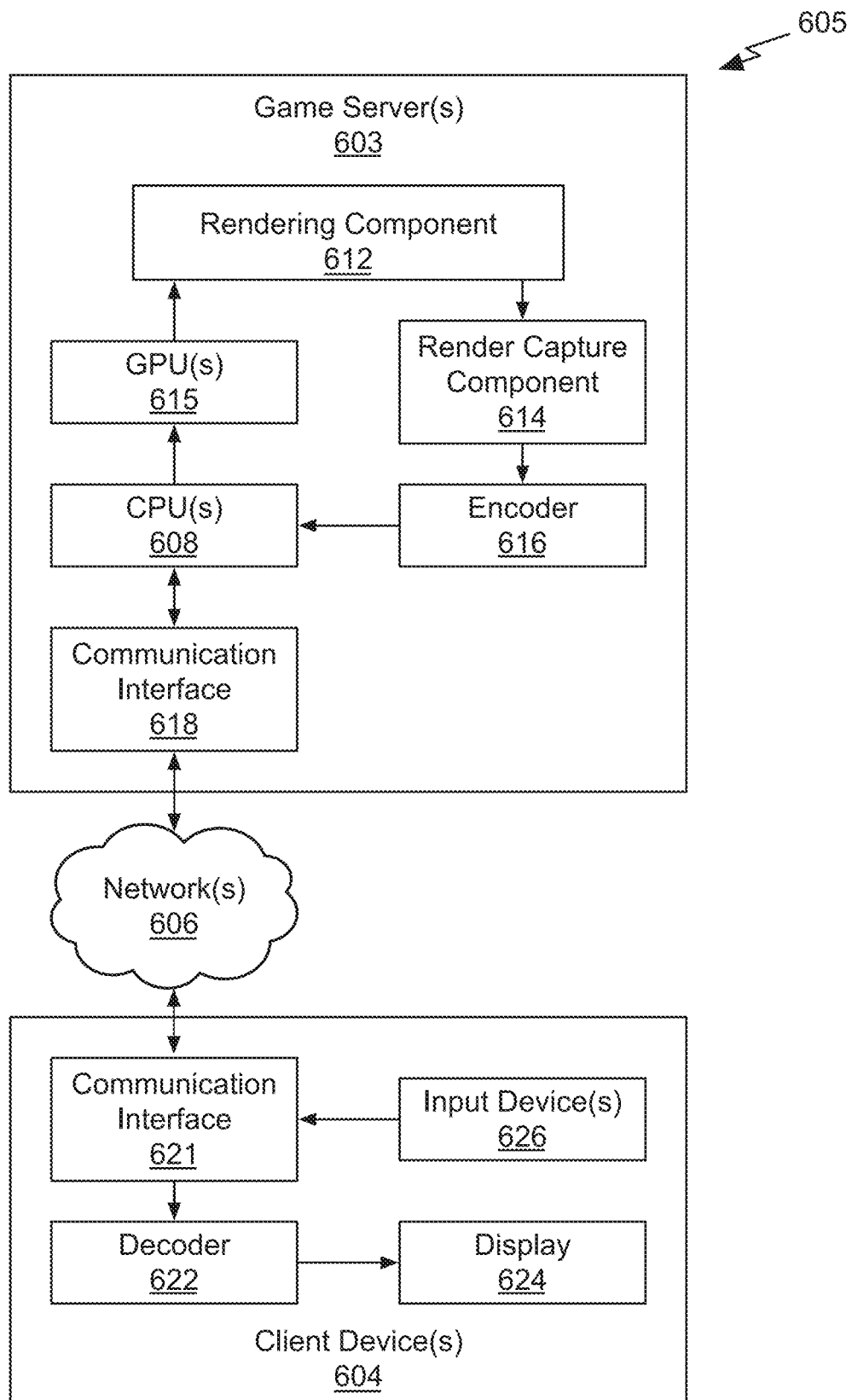
FIG. 6 illustrates an exemplary game streaming system suitable for use in implementing some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s) 626, transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) 615 of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) 626 and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs 615, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on"

and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
receiving a scale factor for each vector of quantized parameters within a single dimension of a first multi-dimensional input tensor to provide a plurality of scale factors, each quantized parameter in each vector having a bitwidth that is reduced according to a corresponding per-vector scale factor of the plurality of scale factors, wherein the corresponding scale factor is a scale factor in the plurality of scale factors corresponding to the vector of quantized parameters;
computing, by a processor, a vector dot-product value for each vector of quantized parameters, wherein for each vector, a set of multipliers receives at least a subset of the quantized parameters in the vector and performs multiplication operations at the bitwidth to compute the vector dot-product value for the vector;
modifying, for each vector of quantized parameters, each vector dot-product value according to the corresponding scale factor to produce a scaled vector dot-product value; and
accumulating the scaled vector dot-product values to produce each element of a multi-dimensional output tensor.

2. The computer-implemented method of claim 1, wherein modifying the vector dot-product values comprises multiplying each vector dot-product value by the corresponding scale factor.

3. The computer-implemented method of claim 1, wherein the quantized parameters comprise first inputs and a second multi-dimensional input tensor comprises second inputs, and wherein modifying the vector dot-product values comprises multiplying each vector dot-product value by the corresponding scale factor for the first inputs and the corresponding scale factor for the second inputs.

4. The computer-implemented method of claim 1, wherein the quantized parameters comprise first inputs and a second multi-dimensional input tensor comprises second inputs, and wherein modifying the vector dot-product values comprises:
multiplying the corresponding scale factor for the first inputs and the corresponding scale factor for the second inputs to produce a scale product factor;
rounding the scale product factor; and
multiplying each vector dot-product value by the rounded scale factor to produce the scaled vector dot-product values.

5. The computer-implemented method of claim 1, further comprising receiving a coarse scale factor for the first multi-dimensional input tensor, wherein the coarse scale factor is shared for multiple vectors of quantized parameters.

6. The computer-implemented method of claim 5, further comprising by multiplying each element of the multi-dimensional output tensor output value by the coarse scale factor.

7. The computer-implemented method of claim 5, wherein the scale factor is an integer format number and the coarse scale factor is a floating-point format number.

8. The computer-implemented method of claim 1, wherein the processor is configured to implement a neural network model and the multi-dimensional output tensor is generated for a layer of the neural network model.

9. The computer-implemented method of claim 8, wherein the neural network model processes the quantized parameters to perform a task that includes at least one of speech recognition, text recognition, segmentation, classification, navigation, autonomous vehicle control, or analysis of sensor-acquired data.

10. The computer-implemented method of claim 1, wherein a precision of each quantized parameter is reduced according to the scale factor for the vector of quantized parameters before the vector dot-product value is computed.

11. The computer-implemented method of claim 1, wherein the steps of receiving, computing, modifying, and accumulating are performed on a server or in a data center to generate data, and the data are streamed to a user device.

12. The computer-implemented method of claim 1, wherein the steps of receiving, computing, modifying, and accumulating are performed within a cloud computing environment.

13. The computer-implemented method of claim 1, wherein the steps of receiving, computing, modifying, and accumulating are performed on a virtual machine comprising a portion of a graphics processing unit or multi-core processor.

14. A system, comprising:
a processor configured to:
receive a scale factor for each vector of quantized parameters within a single dimension of a multi-dimensional quantized parameter input tensor to provide a plurality of scale factors, each quantized parameter in each vector having a bitwidth that is reduced according to a corresponding per-vector scale factor of the plurality of scale factors, wherein the corresponding scale factor is a scale factor in the plurality of scale factors corresponding to the vector of quantized parameters;
compute a vector dot-product value for each vector of quantized parameters, wherein for each vector, a set of multipliers receives at least a subset of the quantized parameters in the vector and performs multiplication operations at the bitwidth to compute the vector dot-product value for the vector;
modify, for each vector of quantized parameters, each vector dot-product value according to the corresponding scale factor to produce a scaled vector dot-product value; and
accumulate the scaled vector dot-product values to produce each element of a multi-dimensional output tensor.

15. The system of claim 14, wherein the vector dot-product values are modified by multiplying each vector dot-product value by the corresponding scale factor.

16. The system of claim 14, wherein the quantized parameters comprise first inputs and a second multi-dimensional input tensor comprises second inputs, and wherein the vector dot-product values are modified by multiplying each vector dot-product value by the corresponding scale factor for the first inputs and the corresponding scale factor for the second inputs.

17. A non-transitory computer-readable media storing computer instructions that, when executed by one or more processors, cause the one or more processors to perform the steps of:
receiving a scale factor for each vector of quantized parameters within a single dimension of a multi-dimensional quantized parameter input tensor to provide a plurality of scale factors, each quantized parameter in each vector having a bitwidth that is reduced according to a corresponding per-vector scale factor of the plurality of scale factors, wherein the corresponding scale factor is a scale factor in the plurality of scale factors corresponding to the vector of quantized parameters;

computing a vector dot-product value for each vector of quantized parameters, wherein for each vector, a set of multipliers receives at least a subset of the quantized parameters in the vector and performs multiplication operations at the bitwidth to compute the vector dot-product value for the vector;

modifying, for each vector of quantized parameters, each vector dot-product value according to the corresponding scale factor to produce a scaled vector dot-product value; and accumulating the scaled vector dot-product values to produce each element of a multi-dimensional output tensor.

18. The non-transitory computer-readable media of claim 17, wherein modifying the vector dot-product values comprises multiplying each vector dot-product value by the corresponding scale factor.

19. The non-transitory computer-readable media of claim 17, wherein the quantized parameters comprise first inputs and a second multi-dimensional input tensor comprises second inputs, and wherein modifying the vector dot-product values comprises multiplying each vector dot-product value by the corresponding scale factor for the first inputs and the corresponding scale factor for the second inputs.

20. A computer-implemented method, comprising:

receiving, by a neural network model, a first multi-dimensional input tensor of quantized parameters, each quantized parameter in each vector having a bitwidth that is reduced according to a corresponding per-vector scale factor, wherein the per-vector scale factor is computed for a portion of the parameters in a single dimension of the first multi-dimensional input tensor;

receiving a coarse scale factor that is shared by the quantized parameters in the first multi-dimensional input tensor;

processing the first multi-dimensional input tensor and a second multi-dimensional input tensor by the neural network model to produce a multi-dimensional output tensor, wherein for each vector, a set of multipliers receives at least a subset of the quantized parameters in the vector and performs multiplication operations at the bitwidth to produce a value, wherein the value is modified according to the corresponding per-vector scale factor to produce an element of the multi-dimensional output tensor; and multiplying each element of the multi-dimensional output tensor by the coarse scale factor to produce a scaled multi-dimensional output tensor.

21. The computer-implemented method of claim 20, wherein the neural network model performs a task including at least one of speech recognition, text recognition, segmentation, classification, navigation, autonomous vehicle control, or analysis of sensor-acquired data.

22. The computer-implemented method of claim 20, wherein the value is a vector dot-product value and the processing further comprises:

multiplying each vector dot-product value according to the corresponding per-vector scale factor to produce a scaled vector dot-product value; and accumulating the scaled vector dot-product values to produce each element of the multi-dimensional output tensor.

* * * * *